United States Patent
Rushing et al.

(10) Patent No.: US 11,444,906 B1
(45) Date of Patent: Sep. 13, 2022

(54) UPDATING A USER INTERFACE BASED ON PROXIMITY DATA OF USERS OF A COMMUNICATION PLATFORM

(71) Applicant: Slack Technologies, Inc., San Francisco, CA (US)

(72) Inventors: Justin Rushing, Oakland, CA (US); Akshay Bakshi, Vancouver (CA); Scott Buchanan, Vancouver (CA); Leena Mansour, Toronto (CA)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/383,130

(22) Filed: Jul. 22, 2021

(51) Int. Cl.
*H04L 51/222* (2022.01)
*H04L 51/04* (2022.01)
*H04L 65/401* (2022.01)
*H04L 65/403* (2022.01)
*H04L 51/216* (2022.01)
*H04W 4/021* (2018.01)

(52) U.S. Cl.
CPC .......... *H04L 51/222* (2022.05); *H04L 51/04* (2013.01); *H04L 51/216* (2022.05); *H04L 65/403* (2013.01); *H04L 65/4015* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 9,479,900 B2* | 10/2016 | Xu | H04L 12/1818 |
| 9,628,950 B1* | 4/2017 | Noeth | H04W 4/021 |
| 9,641,989 B1* | 5/2017 | Dietrich | H04N 21/4788 |
| 10,939,246 B1* | 3/2021 | Dancie | H04W 4/14 |
| 11,109,186 B1* | 8/2021 | Nuss | H04W 4/21 |
| 11,218,868 B1* | 1/2022 | Gu | G01S 5/00 |
| 2002/0165898 A1* | 11/2002 | Duffy | G06Q 10/10 718/102 |
| 2005/0010463 A1* | 1/2005 | Du | G06Q 10/10 705/7.15 |

(Continued)

OTHER PUBLICATIONS

U.S. Appl. No. 16/993,859, filed Aug. 14, 2020, Butterfield, et al., "Electronic Board Associated With a Communication Platform", 45 pages.

(Continued)

*Primary Examiner* — Backhean Tiv
(74) *Attorney, Agent, or Firm* — Lee & Hayes, P.C.

(57) ABSTRACT

Using proximity data to update user interfaces for users of a communication platform is described. The communication platform can determine, for a first user of the communication platform, a first location of the first user and for at least a second user of the communication platform, a second location of the second user. Based at least in part on a determination that the first location and the second location satisfy a condition, the communication platform can cause a user interface of the communication platform to be updated, wherein the updated user interface indicates at least one of (i) proximity data associated with the first user and the second user or (ii) context data associated with at least one of the first user or the second user.

20 Claims, 11 Drawing Sheets

(56) References Cited

U.S. PATENT DOCUMENTS

| | | | | |
|---|---|---|---|---|
| 2006/0161680 A1* | 7/2006 | Balsevich | H04L 67/10 | 709/227 |
| 2007/0250581 A1* | 10/2007 | Patel | H04L 51/224 | 709/206 |
| 2008/0028031 A1* | 1/2008 | Bailey | G06Q 10/10 | 709/206 |
| 2008/0132252 A1* | 6/2008 | Altman | H04W 4/021 | 455/457 |
| 2013/0091217 A1* | 4/2013 | Schneider | G06Q 50/01 | 709/204 |
| 2014/0129645 A1* | 5/2014 | Mo | G06Q 10/101 | 709/205 |
| 2015/0304368 A1* | 10/2015 | Vaccari | G06F 16/9535 | 709/204 |
| 2015/0304436 A1* | 10/2015 | Vaccari | H04W 4/21 | 709/204 |
| 2015/0319203 A1* | 11/2015 | Jeremias | H04L 51/222 | 715/753 |
| 2015/0365787 A1* | 12/2015 | Farrell | H04W 4/02 | 455/456.1 |
| 2016/0005003 A1* | 1/2016 | Norris | H04L 65/403 | 455/456.3 |
| 2016/0057576 A1* | 2/2016 | Kessler | H04W 12/08 | 455/411 |
| 2018/0026929 A1* | 1/2018 | Nambiar | H04L 67/55 | 709/206 |
| 2018/0034763 A1* | 2/2018 | Rincon Ferrera | H04L 51/216 | |
| 2018/0276581 A1* | 9/2018 | Sakurai | G06Q 10/10 | |
| 2018/0287982 A1* | 10/2018 | Draeger | H04L 51/216 | |
| 2021/0235246 A1* | 7/2021 | Hovey | H04W 80/02 | |
| 2021/0377694 A1* | 12/2021 | Nuss | H04W 4/026 | |
| 2022/0070133 A1* | 3/2022 | Santo | H04L 51/216 | |

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

UPDATING A USER INTERFACE BASED ON PROXIMITY DATA OF USERS OF A COMMUNICATION PLATFORM

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating messages posted to and/or actions taken with respect to a particular channel, direct message, and/or other virtual space.

BRIEF DESCRIPTION OF THE FIGURES

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
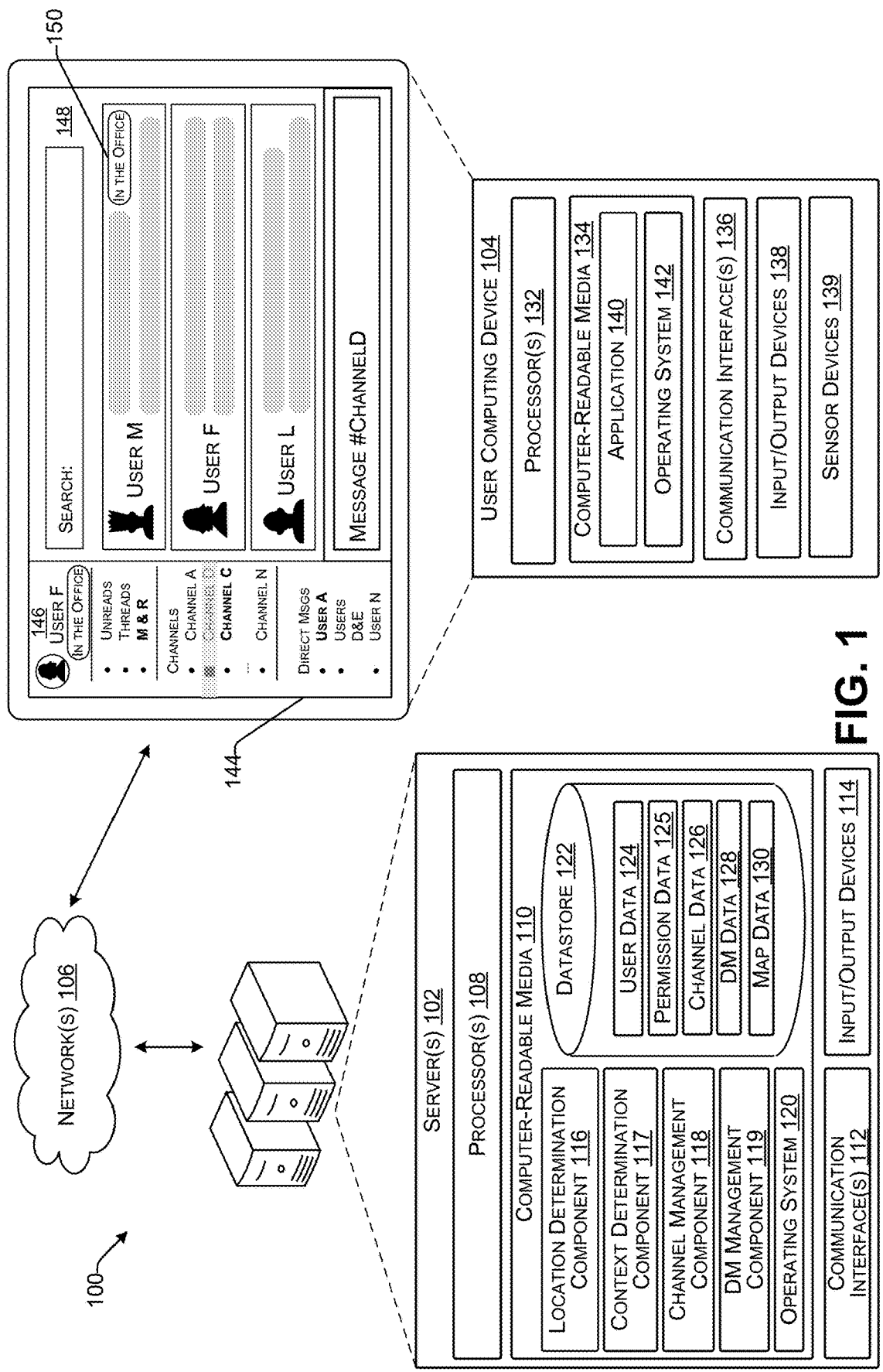
FIG. 1 illustrates an example environment for performing techniques described herein.

This application relates to determining proximity between users of a communication platform and updating a user interface of the communication platform based at least in part on the determined proximity. The communication platform, which, in some examples can be a group-based communication platform, a channel-based communication platform, a permission-based communication platform, a channel-based messaging platform, and/or any other platform for facilitating communication between and among users, can enable users to exchange messages and/or other data via the communication platform. In some examples, proximate users that communicate via a communication platform may miss opportunities to meet or collaborate in-person. In some examples, proximate users collaborating in-person may want to memorialize their collaboration to provide certain benefits and/or efficiencies, such as providing a record of the collaboration. Techniques described herein utilize various location determination techniques to determine locations of users of the communication platform and, based at least in part on a determination that determined locations of two or more users satisfy a condition (e.g., the users are "proximate" one another or are otherwise "co-located"), a user interface of the communication platform can be updated to indicate the determined proximity between users and/or context data associated therewith. In some examples, proximity data and/or context data can be represented by a user interface element rendered in an updated user interface. In some examples, proximity data and/or context data can update the user interface by causing features of the user interface to be rearranged, for example, to prioritize virtual spaces, tasks, messages, and/or the like associated with proximate users. In some examples, the user interface can be updated to enable a user to perform an action, such as reserving a conference room, generating a new virtual space (e.g., a new channel, a new direct message, a new asynchronous meeting, a new video conference, a new board, etc.), and/or the like with users determined to be proximate to the user.

Techniques described herein relate to collecting location data and, in some examples, other personally identifiable information. Further, techniques described herein relate to sharing location data and/or other personally identifiable information. As such, techniques described herein can request that users consent to sharing such location data and/or other personally identifiable information with the communication platform and/or other users. That is, in at least one example, users can opt-in to sharing location data and/or other personally identifiable information, as described herein. In some examples, such an "opt-in" can be an express opt-in. In other examples, such an "opt-in" can be an implied opt-in. In any event, location data, and any personally identifiable information, used for techniques described herein, may only be obtained, stored, and/or shared by the communication platform with permission from users, which can be controlled by users via privacy settings or other permissions of the communication platform. In some examples, a user may use the communication platform and may opt not to share location or other personally identifiable information.

Techniques described herein utilize various location determination techniques. For example, a communication platform can receive location data, such as global positioning system (GPS) data from clients of users of the communication platform. In at least one example, location data can be used to determine locations of users of the communication platform. In some examples, location data can be used to determine that two or more users are within a geofence (e.g., a virtual perimeter for a real-world geographic area). In some examples, location data can be used to determine that two or more users are within a threshold distance of one another. In some examples, location data can be used to determine that two or more users are in a same geographic location, such as a town, a neighborhood, a building, a floor, a conference room, and/or the like. In some examples, additional or alternative location determination techniques can be used to determine locations, and thus proximities, of users of the communication platform. Such additional or alternative location determination techniques can utilize additional or alternative data including, but not limited to, network access points, internet protocol (IP) addresses, beacon data, camera data, and/or the like to determine locations, and thus proximities, of users of the communication platform.

Techniques described herein can utilize locations and/or proximities of users to present context data to users of the communication platform. In some examples, such context data can comprise determined locations and/or proximities. In some examples, such context data can be determined based at least in part on data indicative of interactions of users and the communication platform. In some examples, such context data can be determined based on other stored data such as user profiles, organizational profiles, maps, and/or the like. In some examples, such context data can be determined based on third-party data availed via third-party integrations with the communication platform. In at least one example, context data can be presented via a user interface associated with the communication platform, for example to provide proximate users information about one another.

In some examples, context data associated with two or more proximate users can be presented via a notification or message rendered in a user interface of the communication platform. That is, based at least in part on determining that two or more users are proximate one another, the user interface can be updated to present a notification or a message. In some examples, context data associated with two or more proximate users can be presented by rearranging features of the user interface of the communication platform. In some examples, such rearrangement can prioritize virtual spaces, tasks, messages, etc. associated with proximate users. In some examples, proximity data can be used to prompt two or more proximate users to perform an action or have an action performed, such as reserving a conference room, generating a new virtual space (e.g., a new channel, a new direct message, a new asynchronous meeting, a new video conference, a new board, etc.), and/or the like. That is, in some examples, based at least in part on determining that two or more users are proximate one another or otherwise satisfy a condition, techniques described herein can cause an affordance to be presented via a user interface of the communication platform to enable individual of the users to perform an action or have an action performed. In some examples, the action can be to reserve a conference room so that the proximate users can meet to collaborate in-person. In some examples, the action can be to initialize a recording to memorialize a conversation between the two or more proximate users. In some examples, the action can be to generate a new channel, direct message, asynchronous meeting, video conference, board, and/or the like, with which each of the two or more proximate users are members or otherwise can communicate.

In some examples, location data can be additionally or alternatively used to provide suggestions and/or recommendations to users via a user interface of the communication platform. For example, channels relevant to a particular location can be recommended for a user to join when a user is new to the particular location (e.g., as determined by location data).

Techniques described herein therefore leverage location data to determine proximities between two or more users. Such determined proximities can be used to surface relevant data to users of a communication platform that would not otherwise be available without techniques described herein. That is, the use of communication platform data and location data to render updates to a user interface of the communication platform is an unconventional approach to improving experiences of users using such a communication platform. For example, techniques described herein enable users to access proximity data and/or context data associated with other users to enhance collaboration and provide improvement over existing collaboration techniques. In examples where proximity can be used to rearrange features of a user interface, such rearrangement can enable users to access relevant data (e.g., associated with proximate users) quickly instead of having to browse through various channels, direct messages, or other communication platform data. As such, techniques described herein enable improvements over existing techniques. Moreover, in examples where proximity data can be used to narrow the scope of a search, techniques described herein can reduce computing resources required for performing a search and can enable search results to be more quickly returned. As such, techniques described herein provide improvements over existing techniques. Further, in examples, where techniques described herein enable users to create a new virtual space to communicate with proximate users, such creation can be facilitated via a single interaction with the user interface. Such a single interaction can alleviate the need to manually add individual users to a virtual space and request the new virtual space be created. That is, techniques described herein reduce the number of interactions between users and user interfaces of the communication platform, therefore enabling virtual spaces to be created quicker than with existing techniques. As such, techniques described herein provide improvements over existing techniques.

In addition to improvements described above, techniques described herein enable users to learn about other users with whom they work or otherwise interact. With user consent to share information, techniques described herein can surface relevant information about proximate users so that such users can better collaborate. Techniques described herein are useful for facilitating collaboration and connection in a remote or distributed workforce, wherein users who may not know one another beyond a name or image have the opportunity to connect in person with other users within their proximity. As such, techniques described herein offer improvements over existing techniques.

Additional or alternative benefits offered by techniques described herein are described herein.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such a defined group of users having, for instance, sole access to a given channel, message, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, messages, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, BLUETOOTH® Low Energy (BLE) signal, a Near Field Communication (NFC) signal, a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, messages, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a location determination component 116, a context determination component 117, a channel management component 118, a direct message management component 119, an operating system 120, and a datastore 122.

In at least one example, the location determination component 116 can determine locations of users associated with the communication platform. In at least one example, the location determination component 116 can utilize one or more location determination techniques utilizing location data, network data, IP addresses, beacon data, sensor data, and/or the like.

In at least one example, the location determination component 116 can receive location data, such as GPS data from clients of users of the communication platform. In at least one example, such location data can be used to determine locations of users of the communication platform.

In at least one example, the location determination component 116 can receive network access information, such as which network access points individual clients are using to access the network(s) 106 (e.g., Wi-Fi access point, cellular access point, etc.), which IP addresses individual clients are using to access the network(s) 106, and/or the like. In at least one example, a location corresponding to an access point, IP address, etc. can be associated with a user using such an access point, IP address, etc. to access the network(s) 106. As such, the location determination component 116 can determine a location of a user based at least in part on a determination of which access point, IP address, etc. is being used to access the network(s) 106.

In some examples, a location can have beacons or other sensing devices distributed within and/or around the location. Such beacons or other sensing devices can provide sensor data to the location determination component 116 (e.g., directly or indirectly via intermediary computing devices). In at least one example, the location determination component 116 can determine a location of a user based at least in part on such sensor data.

In some examples, a user can utilize a camera or video capturing mechanism on their user computing device 104 to capture an image and/or video of their surroundings. In some examples, such image and/or video data can be provided to the location determination component 116 (e.g., directly or indirectly via a component associated with a user computing device 104). In such examples, the location determination component 116 (or another component associated with the server(s) 102) can perform image processing, sound processing, and/or the like to determine a location of the user.

Figure 2A:
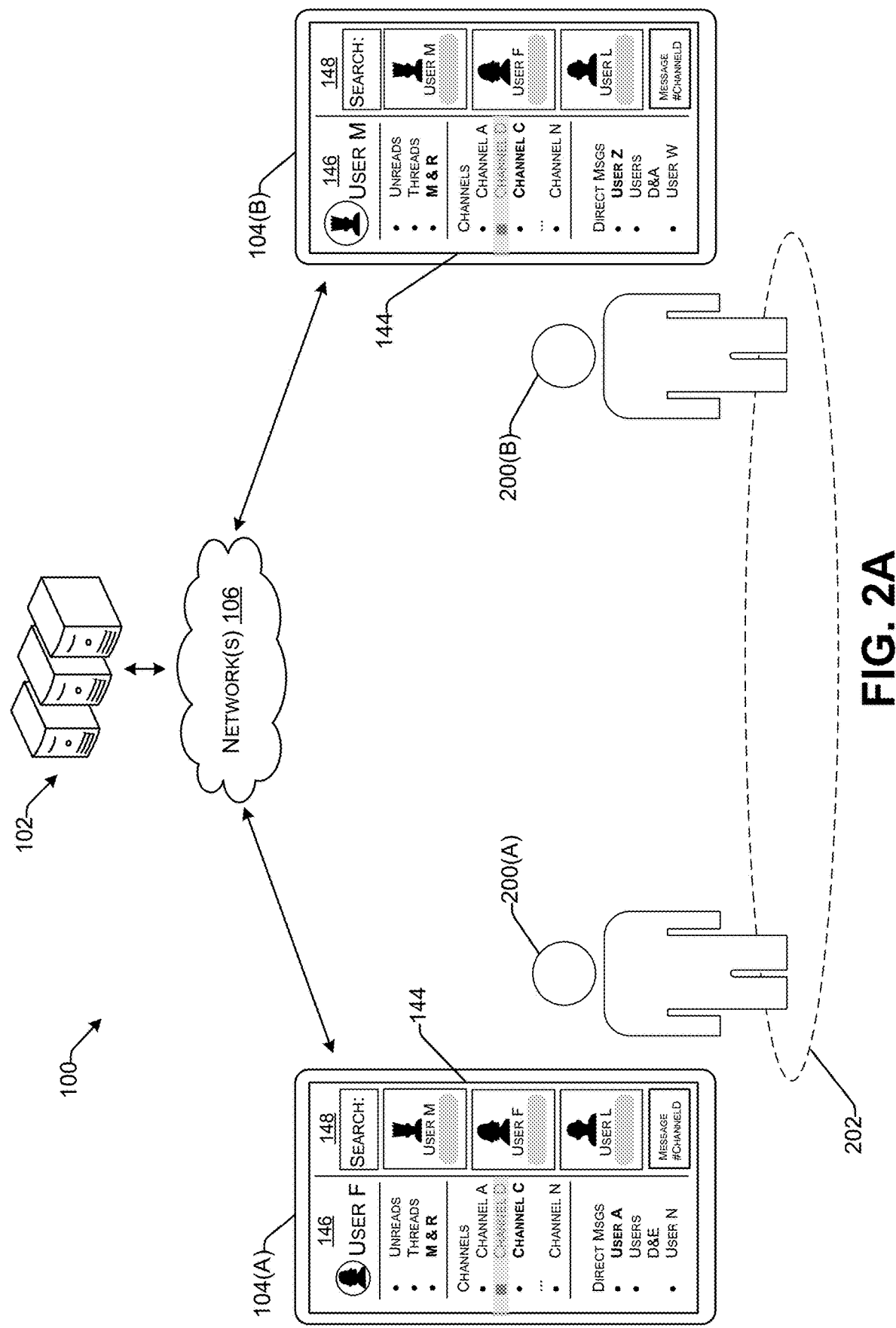
FIG. 2A illustrates an example environment wherein two users are determined to be proximate to one another based at least in part on a determination that a condition is satisfied.

In some examples, determined locations of users can be used to determine proximity of users. For instance, in at least one example, determined locations of users can be used to determine that two or more users are within a geofence (e.g., a virtual perimeter for a real-world geographic area). That is, the location determination component 116 can determine a location associated with the user using one or more of the techniques described above. The location determination component 116 can compare the location with one or more geofences to determine whether the location of the user is within a geofence. Based at least in part on a determination that the location of the user is within the geofence, the location determination component 116 can determine that the user is within the geofence. In some examples, a geofence can be associated with a particular geographic location (e.g., a town, a neighborhood, a building, a floor, a conference room, and/or the like). In some examples, when two or more users are within a same geofence, the location determination component 116 can determine that the two or more users are proximate one another or are co-located. FIG. 2A illustrates an example of two users 200(A) and 200(B) that are both with a same geofence 202 such that they are proximate one another.

Figure 2B:
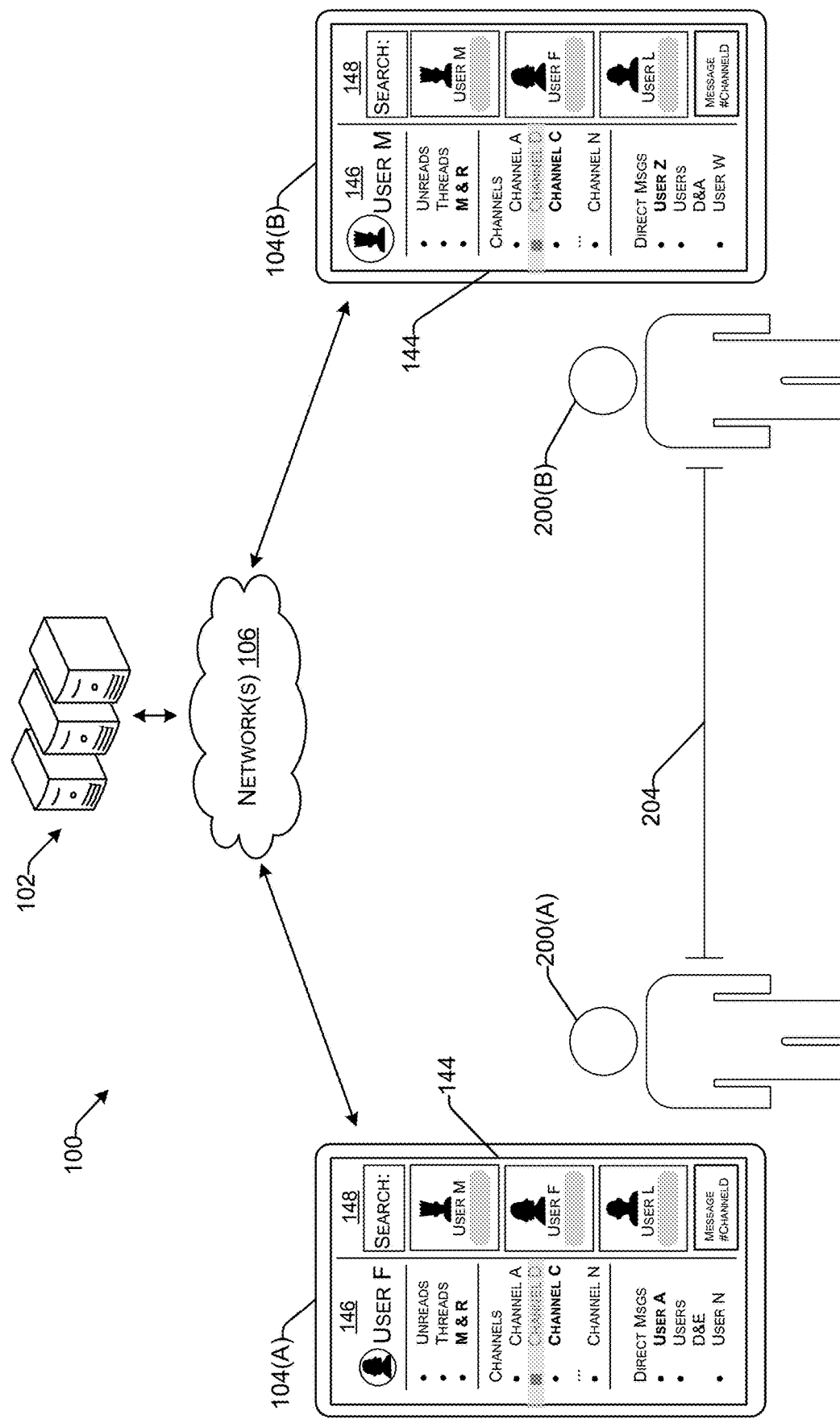
FIG. 2B illustrates another example environment wherein two users are determined to be proximate to one another based at least in part on a determination that a condition is satisfied.

In some examples, determined locations of users can be used to determine that two or more users are within a threshold distance of one another. For example, the location determination component 116 can determine a first location associated with a first user using one or more of the techniques described above. The location determination component 116 can determine a second location associated with a second user using one or more of the techniques described above. In at least one example, the location determination component 116 can determine that the first location is within a threshold distance of the second location. In some examples, users that are within a threshold distance of one another can be proximate one another or can be co-located. FIG. 2B illustrates an example of the two users 200(A) and 200(B) of FIG. 2A that are within a threshold distance (represented by line 204) of one another such that they are proximate one another.

Figure 2C:
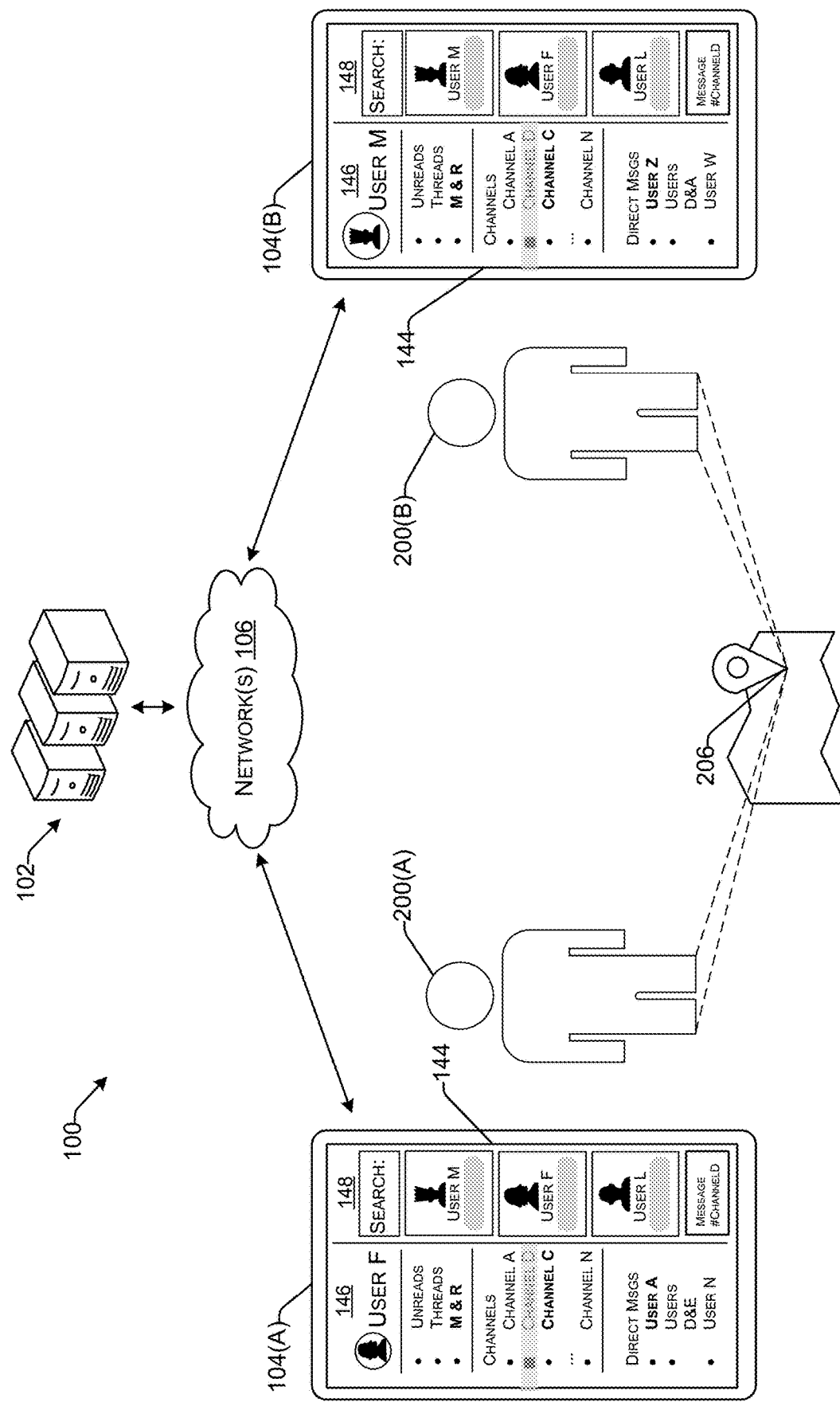
FIG. 2C illustrates yet another example environment wherein two users are determined to be proximate to one another based at least in part on a determination that a condition is satisfied.

In some examples, determined locations of users can be used to determine that two or more users are in a same geographic location, such as a town, a neighborhood, a building, a floor, a conference room, and/or the like. For example, the location determination component 116 can determine, based at least in part on map data associated with a map (e.g., a diagrammatic representation of an area that can include features of the area), a first location associated with the first user corresponds to a geographic location on a map. The location determination component 116 can determine, based at least in part on the map data, a second location associated with the second user corresponds to the geographic location on the map. In some examples, a geographic location can be associated with a geofence. In some examples, users that are in a same geographic location of one another can be proximate one another or can be co-located. FIG. 2C illustrates an example of two users 200(A) and 200(B) of FIG. 2A that are both associated with a same geographic location 206 such that they are proximate one another. As described above, in some examples, the geographic location can comprise a town, a neighborhood, a building, a floor, a conference room, and/or the like.

In some examples, two or more users using a same access point, same IP address, etc. can be determined to be proximate one another or can be co-located.

As described above, in some examples, additional or alternative location determination techniques can be used to determine locations, and thus proximities, of users of the communication platform. For instance, in at least one example, a first client of a first user can detect that a second client of a second user is proximate to the first client. In some examples, the user computing device 104 can output a signal such as a BLE signal, a NFC signal, an inaudible sound signal, and/or another proximity sensor signal that is detectable by other user computing devices. In such an example, the first client can detect a signal from a second client and, based at least in part on a determination that the signal strength meets or exceeds a threshold, can determine that the second client is proximate the first client. In some examples, the first client can utilize triangulation or other proximity determination techniques to determine that the second client is proximate the first client. In such an example, the first client can send an indication of such proximity to the server(s) 102. The location determination component 116 can determine that the first and second users are proximate or co-located based at least in part on receiving such an indication.

In at least one example, an indication that two or more users are proximate one another can be associated with "proximity data." That is, in some examples, such proximity data can indicate that two or more users are proximate one another. In some examples, such proximity data can include an indication of a location of one or more of the users in addition to, or as an alternative of, a general indication that two or more users are proximate one another. In some examples, such proximity data can include an indication of a relative distance between each of the two or more users.

In some examples, a determination of proximity can trigger an update to a user interface of the communication platform (as presented to the users determined to be proximate one another). That is, in some examples, proximity can comprise a condition for updating the user interface such that satisfaction of the condition (i.e., a determination of proximity) can cause the update to the user interface. In some examples, such an update can include proximity data and/or context data.

In at least one example, the context determination component 117 can access and/or determine context data associated with two or more proximate or co-located users of the communication platform. In some examples, a determination of proximity can be associated with satisfaction of a condition that triggers the context determination component 117 to determine context associated with the proximate users. For example, based at least in part on determining that two or more users are proximate one another, the context determination component 117 can access data associated with each of the users to determine context data. In at least one example, the context data can be presented via a user interface of the communication platform and/or can be used to update features of the user interface. Furthermore, in some examples, the context data can be used to recommend an action for one of the two or more users to perform and/or initiate performance thereof.

In some examples, the context determination component 117 can access interaction data associated with interactions between each of the users and the communication platform. Such interaction data can indicate whether the two or more users have exchanged messages or otherwise collaborated via the communication platform, virtual space(s) within which the two or more users have exchanged messages or otherwise collaborated via the communication platform, a most recent interaction between the two or more users, read statuses associated with individual messages, tasks associated with the two or more users, and/or the like.

In some examples, based at least in part on determining that the two or more users are proximate one another, the context determination component 117 can determine context data based at least in part on the interaction data and in some examples, can cause an indication thereof to be presented via the user interface. In at least one example, based at least in part on determining that the two or more users are proximate one another, the context determination component 117 can cause an indication of a level of interactivity between the two or more users to be presented via a user interface of the communication platform. Additionally or alternatively, the context determination component 117 can cause a notification or message to be presented via the user interface to notify the proximate users that they are in a particular virtual space together. As another example, the context determination component 117 can cause a notification or message to be presented via the user interface to notify one (or each) of the proximate users of an unread message from one of the proximate users or an outstanding task associated with one of the proximate users. That is, in some examples, based at least in part on determining that the two or more users are proximate one another, the context determination component 117 can cause an indication of the virtual space(s) with which the two or more users are associated to be presented via a user interface of the communication platform, an indication of the most recent interaction between the two or more users to be presented via the user interface of the communication platform, an indication that a message has not yet been read (and the message), and/or the like. Surfacing such information can provide an improvement over existing techniques in that accessing relevant interaction data when a user is determined to be proximate another user can alleviate the need for users to browse and scroll through significant amounts of data if/when they approach/are approached by other proximate users.

In some examples, the context determination component 117 can cause a user interface of the communication platform to be updated based on determined context data, for example, by rearranging an order of channels, direct messages, and/or the like as they are presented via the user interface such to prioritize a channel, direct message, or the like with which the two or more proximate users are associated. Prioritizing such information can provide an improvement over existing techniques in that prioritizing relevant interaction data when a user is determined to be proximate another user can alleviate the need for users to browse and scroll through significant amounts of data if/when they approach/are approached by other proximate users. In some examples, the context determination component 117 can filter search results based on proximity and/or context data. Such filtering can reduce computing resources required for performing a search and can enable search results to be more quickly returned.

In some examples, based at least in part on determining that two or more users are proximate one another, the context determination component 117 can access task list data indicating one or more tasks associated with each of the two or more users. In some examples, individual of the tasks can be associated with individual users. In at least one example, the context determination component 117 can determine that a task is associated with the two or more proximate users and can cause an indication of such a task to be presented via a user interface of the communication platform. That is, in some examples, the task list data can comprise context data, which can be used by the context determination component 117 for updating the user interface.

In some examples, based at least in part on determining that two or more users are proximate one another, the context determination component 117 can access organizational data of organization(s) with which the two or more users are associated. In some examples, such organizational data can indicate role(s) of individual users, a reporting structure or hierarchy of individual users, and/or the like. In some examples, based at least in part on determining that the two or more users are associated with a particular relationship (e.g., same role, hierarchical roles (e.g., one reports to the other, etc.), etc.), the context determination component 117 can cause an indication to be presented via a user interface of the communication platform that indicates the particular relationship. That is, in some examples, the organizational data can comprise context data, which can be used by the context determination component 117 for updating the user interface.

In some examples, based at least in part on determining that two or more users are proximate one another, the context determination component 117 can access user data associated with the two or more users. In some examples, such user data can be stored in the datastore 122. In some examples, such user data can be accessible from a third-party platform integrated with the communication platform (e.g., via the use of one or more application programming interfaces (API(s)), etc.). Such user data can indicate preferences of the users, contact information for the users, whether the users are looking for other users to participate in an event (e.g., a meal, a workgroup, an activity, etc.), skills of the users, roles of the users, groups with which the users are associated, hobbies of the users, recent purchases of the users, social networks of the users, etc. In some examples, the context determination component 117 can cause user data to be presented via a user interface of the communication platform to enable proximate users to learn about one another. That is, in some examples, the user data can comprise context data, which can be used by the context determination component 117 for updating the user interface. In some examples, such updates can indicate preferences of proximate users, contact information for proximate users, whether proximate users are looking for other users to participate in an event (e.g., a meal, a workgroup, an activity, etc.), skills of proximate users, roles of proximate users, groups with which proximate users are associated, hobbies of proximate users, recent purchases of proximate users, social networks of proximate users, etc.

In some examples, the context determination component 117 can utilize location data and/or proximity data to determine context data that can be presented via a user interface of the communication platform. For example, based at least in part on the location data indicating that a user is in a geographical location that corresponds to an office building and/or is connecting to the network(s) 106 via a particular network access point and/or IP address corresponding to the office building, the context determination component 117 can cause an indication that the user is in the office to be presented via a user interface of the communication platform. In some examples, instead of identifying that user is in an office building, the context determination component 117 can determine that a user is in a particular conference room, building, neighborhood, town, or the like and can cause an indication of such to be presented via a user interface of the communication platform. In some examples, the context determination component 117 can determine directions to enable users to find other proximate users and/or locations (e.g., a particular conference room, building, neighborhood, town, etc.), for example by outputting turn-by-turn directions, presenting a map to guide a user in a space, haptic or other tactile output, and/or the like. In some examples, the context determination component 117 can utilize context data to cause user interface elements to be presented via a user interface of the communication platform to indicate proximity of users, locations of users, directions, and/or the like. In some examples, user computing device(s) can output sounds or other signals to indicate proximity, location, and/or guide a user to other proximate users and/or locations. Like other location data and/or personally identifiable information, a user can be required to opt in to sharing their location and/or directions to their location.

In some examples, the context determination component 117 can utilize context data to recommend an action for a user of two or more proximate users to perform and/or initialize the performance thereof. For example, based at least in part on receiving an indication that two or more users are proximate one another, the context determination component 117 can recommend that the two or more users create a new virtual space, such as a channel, a direct message, an asynchronous meeting, a video conference, a board, or the like. In such an example, the context determination component 117 can cause an affordance to be presented via a user interface of the communication platform to enable the two or more users to create such a new virtual space. In at least one example, when the new virtual space is created, the user interface can be updated to include the new virtual space. In such examples, where techniques described herein enable users to create a new virtual space to communicate with proximate users, such creation can be facilitated via a single interaction with the user interface. Such a single interaction can alleviate the need to manually add individual users to a virtual space and request the new virtual space be created. That is, techniques described herein reduce the number of interactions between users and user interfaces of the communication platform, therefore enabling virtual spaces to be created quicker than with existing techniques.

In some examples, based at least in part on receiving an indication that two or more users are proximate one another, the context determination component 117 can recommend that the two or more users reserve a conference room and can cause an affordance to be presented via a user interface of the communication platform to enable the two or more users to reserve a conference room. Additional or alternative actions are within the scope of this disclosure.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 125, channel data 126, direct message (DM) data 128, and map data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more board identifiers associated with boards with which the user is associated, one or more meetings with which the user is associated, a plurality of messages, a plurality of emojis, a plurality of conversations, a plurality of conversation topics, an avatar, an email address, a real name (e.g., John Doe), a username (e.g., j doe), a password, a time zone, a status, and the like.

In at least one example, the permission data 125 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 125 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 125 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 126. In some examples, permissions can indicate restrictions on individual channels, restrictions on user(s) associated with individual channels, and the like.

In some examples, the permission data 125 can store data associated with permissions of individual messages or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message), or the like. In some examples, permissions associated with a message or other object can be mapped to, or otherwise associated with, data associated with the message or other object. In some examples, permissions can indicate viewing permissions, access permissions, editing permissions, etc.

In at least one example, the channel data 126 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 126 where data related to that channel is stored. Individual messages or other objects posted to a channel can be stored in association with the channel data 126.

In at least one example, the DM data 128 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 128 where data related to that direct message is stored. Individual messages or other objects posted to a direct message can be stored in association with the DM data 128.

As described above, messages posted, or otherwise sent and/or received, via channels, direct messages, etc. can be stored in association with the channel data 126 and/or DM data 128. In some examples, such messages can additionally or alternatively be stored in association with the user data 124. In some examples, messages can be associated with individual permissions, as described herein.

In at least one example, the map data 130 can store maps of geographic locations such as countries, states, cities, neighborhoods, buildings, office floors, etc.

The datastore 122 can store additional or alternative types of data, which can include, but is not limited to board data (e.g., data posted to or otherwise associated with boards of the communication platform), interaction data (e.g., data associated with additional or alternative interactions with the communication platform), location data, proximity data, context data, model(s), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, input/output devices 138, and sensor devices 139.

In at least one example, each processor of the processor(s) 132 can be a single processing unit or multiple processing units and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated.

In at least one example, the user interface 144 can include a second section 148 (e.g., which can be a portion, pane, or other partitioned unit of the user interface 144) that can be associated with a data feed indicating messages posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 3.

In FIG. 1, the user interface 144 is shown with a user interface element 150 representative of proximity data and/or context data. As described above, in at least one example, the location determination component 116 can determine locations of users of the communication platform and can determine proximity data associated therewith. In an example, the location determination component 116 can determine that User F and User M are proximate one another such that both are located in an office building associated with an organization. Based at least in part on such a determination, the context determination component 117 can cause the user interface element 150 to be presented via the user interface 144 to provide an indication to User F that User M is in the office. In at least one example, the user interface 144 can receive an instruction from the context determination component 117 to update the user interface 144 to include the user interface element 150. Of course, the user interface element 150 is one example of the type of proximity data and/or context data that can be presented via the user interface 144.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display (which in some examples can be a touch screen, an augmented reality display, or other device for displaying data), various user interface controls (e.g., buttons, joystick, keyboard, mouse, touch screen, etc.), audio speakers, microphones, cameras, connection ports and so forth. Further, in at least one example, the user computing device 104 can include sensor devices 139, which can include but are not limited to GPS sensors and/or the like, accelerometers, gyroscopes, magnetometers, BLE emitters and/or readers, NFC emitters and/or readers, etc.

While techniques described herein are described as being performed by the location determination component 116, the context determination component 117, the channel management component 118, the direct message management component 119, and the application 140, techniques described herein can be performed by any other component, or combination of components, which can be associated with the server(s) 102, the user computing device 104, or a combination thereof.

As described above, FIGS. 2A-2C illustrate examples of proximate or co-located users within the environment 100 of FIG. 1. FIGS. 2A-2C illustrate different instances of the user interface 144 on two different user computing devices 104(A) and 104(B). In some examples, features of the user interface 144 can be resized and/or rearranged depending on device and/or display characteristics. Additional details associated with each figure are provided above.

Figure 3:
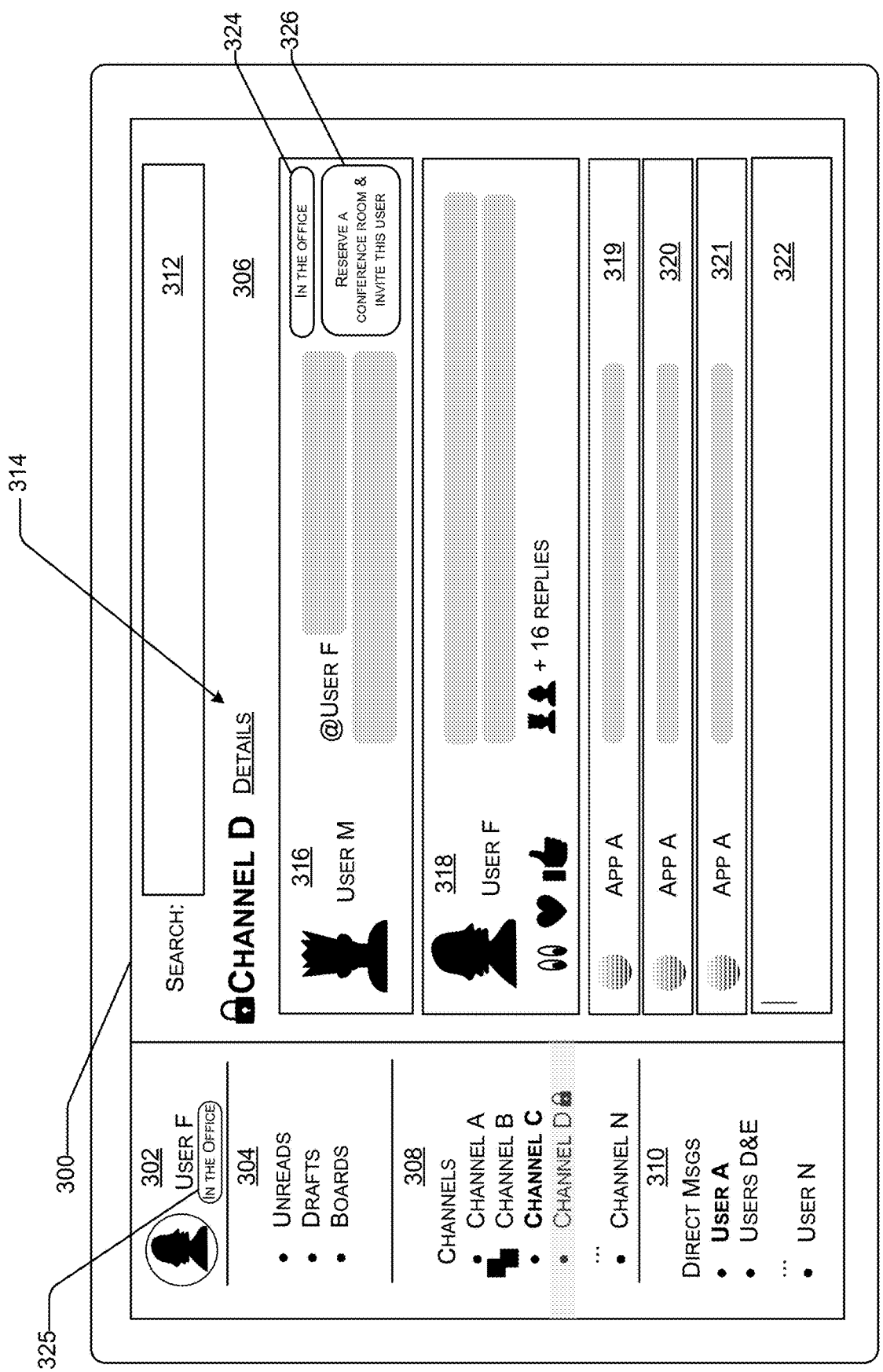
FIG. 3 illustrates an example user interface associated with a communication platform, as described herein, wherein the user interface includes an indication of at least one of proximity or context data associated with a user of the communication platform.

FIG. 3 illustrates an example user interface 300 presented via a communication platform, as described herein. The user interface 300 can correspond to the user interface 144 described above with reference to FIG. 1. As described above, in some examples, a user interface 300 presented via the communication platform can include a first section 302 (which can correspond to the first section 146 described above with reference to FIG. 1) that includes user interface element(s) representing virtual space(s) associated with the workspace(s) with which the user (e.g., account of the user) is associated. In at least one example, the first section 302 can include one or more sub-sections, which can represent different virtual spaces. For example, a first sub-section 304 can include user interface elements representing virtual spaces that can aggregate data associated with a plurality of channels and/or workspaces. In at least one example, each virtual space can be associated with a user interface element in the first sub-section 304. In some examples, a user interface element can be associated with an actuation mechanism, that when actuated, can cause the application 140 to present data associated with the corresponding virtual space via a second section 306 of the user interface 300 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 306, for example in a feed.

In another example, "drafts" can be associated with messages or other objects that have not yet been posted to a virtual space or otherwise sent to a receiving entity. In at least one example, a message, while being composed, can be associated with an indicator indicating that the message is a draft and can therefore be associated with the "drafts" referenced in the second sub-section 308.

In another example, a virtual space can be associated with "boards" with which the user is associated. In at least one example, if the user requests to access the virtual space associated with "boards," one or more boards with which the user is associated can be presented via the user interface 300 (e.g., in the second section 306). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 304 includes a user interface element representative of a virtual space associated with "snippets of content" (e.g., stories) that is actuated by a user, snippets of content associated with the user, which can be associated with different channels and/or virtual spaces, can be presented via the second section 306. In some examples, such snippets of content can be presented via a feed. For the purpose of this discussion, a snippet of content can correspond to audio and/or visual content provided by a user associated with the communication platform.

In some examples, a virtual space can be associated with all meetings with which a user is associated (e.g., a "virtual meeting hub"). That is, in some examples, if the user requests to access the virtual space associated with "meetings" (or something of the like), meetings with which the user is associated can be presented in the second section 306, for example in a feed. In some examples, the virtual meeting hub may include synchronous and asynchronous meetings or collaboration sessions. In some examples, the virtual meeting hub may be organized by meeting type (e.g., asynchronous and synchronous). In some examples, the virtual meeting hub may also include a list of active users currently online and provide a user with a quick way to start a conversation with other active users whether it is via an audio, message, or video-based conversation.

In some examples, data presented via the second section can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) (e.g., member(s) of a channel) posted a message, performed an action, and/or the like. Additional details are described below.

In at least one example, the first section 302 of the user interface 300 can include a second sub-section 308 that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 308 can depict all channels, or a subset of all channels, that the user has permission to access (e.g., as determined by the permission data 125). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 308 can depict all channels, or a subset of all channels, that the user is a member of, and the user can interact with the user interface 300 to browse or view other channels that the user is not a member of but are not currently displayed in the second sub-section 308. In some examples, a new channel, generated subsequent to a request received at the channel management component 118 in FIG. 1 and accessible to the user, can be added to the second sub-section 308. The new channel can be generated by the user or added to the second sub-section 308 in reply to acceptance of an invite sent to the user to join a new channel. In some examples, different types of channels (e.g., public, private, shared, etc.) can be in different sections of the second sub-section 308, or can have their own sub-sections or subsections in the user interface 300. In some examples, channels associated with different workspaces can be in different portions of the second sub-section 308 or can have their own sections or subsections in the user interface 300.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 308 of the user interface 300. In such examples, the user may navigate to a different interface (not shown) to browse additional channels that are accessible to the user but to which the user is not currently a member.

In addition to the second sub-section 308, the first section 302 can include a third subsection 310 that can include user interface elements representative of direct messages. That is, the third subsection 310 can include user interface elements representative of virtual spaces that are associated with private messages between one or more users, as described above.

As described above, in at least one example, the user interface 300 can include a second section 306 that can be associated with data associated with virtual spaces of the communication platform. In some examples, data presented via the second section 306 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 306 can be associated with the same or different workspaces. That is, in some examples, the second section 306 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) and/or entity(s) posted the message and/or performed an action.

A "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data and/or content that can be presented via the second section 306 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 306 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.). As described above, in some examples, the format of the individual channels or virtual spaces may appear differently based on device characteristics and/or display characteristics.

In at least one example, the user interface 300 can include a search mechanism 312, wherein a user can input a search term and the server(s) 102 can perform a search associated with the communication platform. In some examples, the search can be performed across each group with which the user is associated, or the search can be restricted to a particular group, based on a user specification. The search may be performed with one or more shards associated with each group across which the search is performed.

In FIG. 3, the user can interact with the user interface element that corresponds to Channel D in the second sub-section 308 and as such, a feed associated with the channel can be presented via the second section 306 of the user interface. In some examples, the second section 306 can be associated with a header that includes user interface elements 314 representing data associated with Channel D. Furthermore, the second section 306 can include user interface elements 316, 318, 319, 320, and 321 which each represent messages posted to the channel. As illustrated, the user interface elements representative of the messages 316-321 can include an indication of user(s) and/or entity(s) that posted the message, a time when the message was posted, content associated with the message, reactions associated with the message (e.g., emojis, reactjis, etc.), and/or the like. In at least one example, the second section 306 can include an input mechanism 322, which can be associated with a composition user interface to enable a user to compose a message to be posted to the channel. That is, in at least one example, a user can provide input via the input mechanism 322 (e.g., type, speak, etc.) to generate a new message. In some examples, messages can be generated by applications and/or automatically by the communication platform. In some examples, the second section 306 can include user interface elements representative of other objects and/or data associated with the channel (or other virtual space).

As described above, in at least one example, the location determination component 116 can determine that two or more users are proximate one another in a particular geographic location (e.g., an office). In at least one example, based at least in part on such a determination, the context determination component 117 can cause the user interface 300 to be updated to include at least one of proximity data or context data associated with the proximate users. As illustrated in FIG. 3, the user interface 300 includes a user interface element 324 indicating that the user associated with the message (e.g., User M) is in the office. As indicated by the user interface element 325, User F is also in the office.

In some examples, the context determination component 117 can determine that User M and User F are communicating in a channel and are in the office such that they may want to collaborate in person. As such, the context determination component 117 can cause the user interface 300 to present a user interface element 326 to enable the user (e.g., User F) to reserve a conference room and invite User M to the conference room. In at least one example, the user interface element 326 can be associated with an actuation mechanism that when actuated can present a scheduling user interface to enable the user to reserve a conference room and invite User M.

Figure 4:
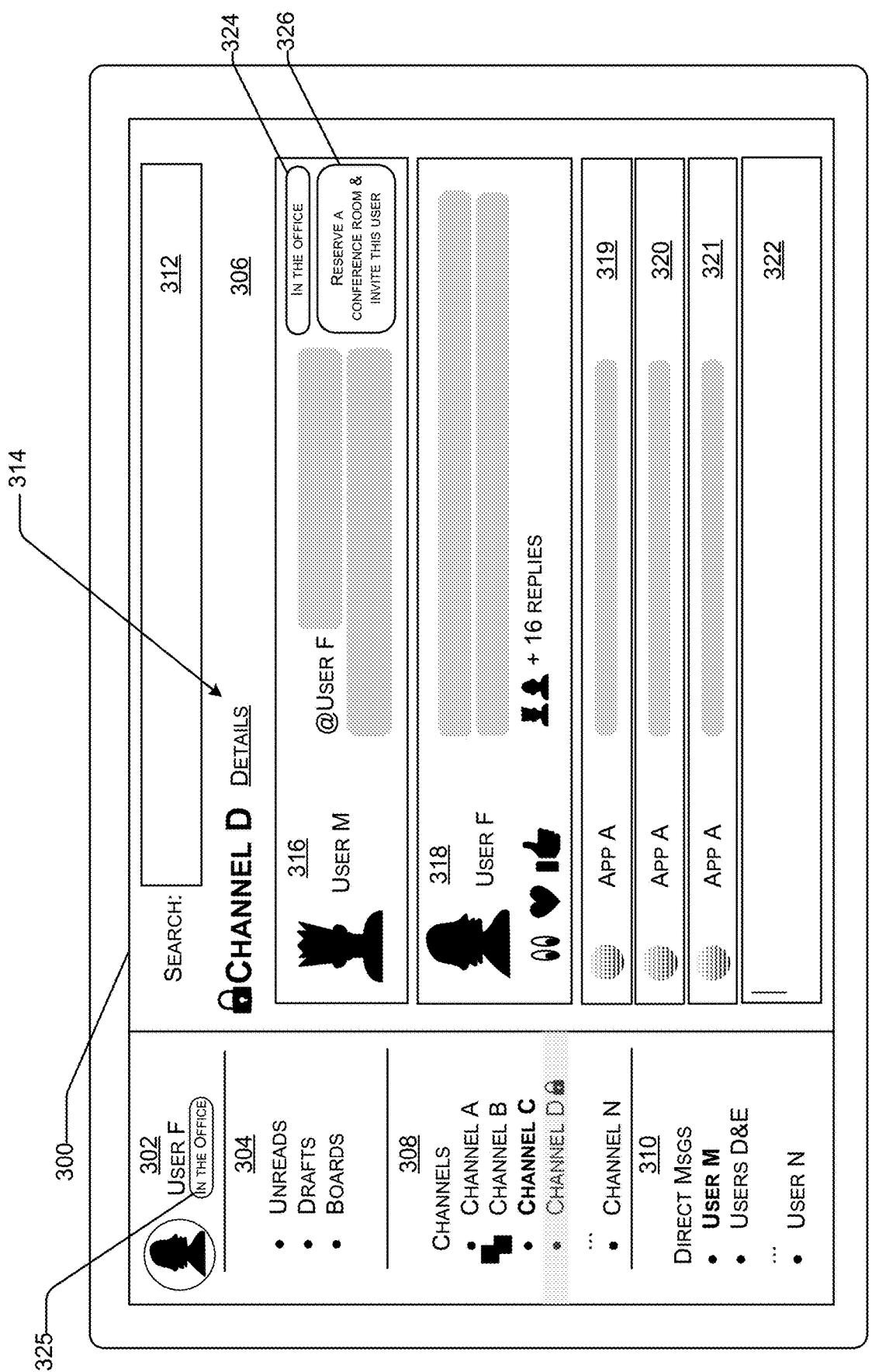
FIG. 4 illustrates another example of the user interface of FIG. 3, wherein the user interface includes an indication of at least one of proximity or context data associated with a user of the communication platform.

In some examples, as illustrated in FIG. 4, the context determination component 117 can utilize the proximity data and/or context data to rearrange features of the user interface 300 (as compared to how the features are presented in FIG. 3). For example, in FIG. 4, the indication of the direct message between User F and User M is now the first indication in the third subsection 310. That is, the indications of direct messages have been updated based at least in part on a determination that User F is proximate User M, wherein the direct message between User F and User M has been prioritized in the user interface 300. In some examples, a similar rearrangement can be done for channels or other virtual spaces. Prioritizing such information can provide an improvement over existing techniques in that prioritizing relevant interaction data when a user is determined to be proximate another user can alleviate the need for users to browse and scroll through significant amounts of data if/when they approach/are approached by other proximate users.

Figure 5:
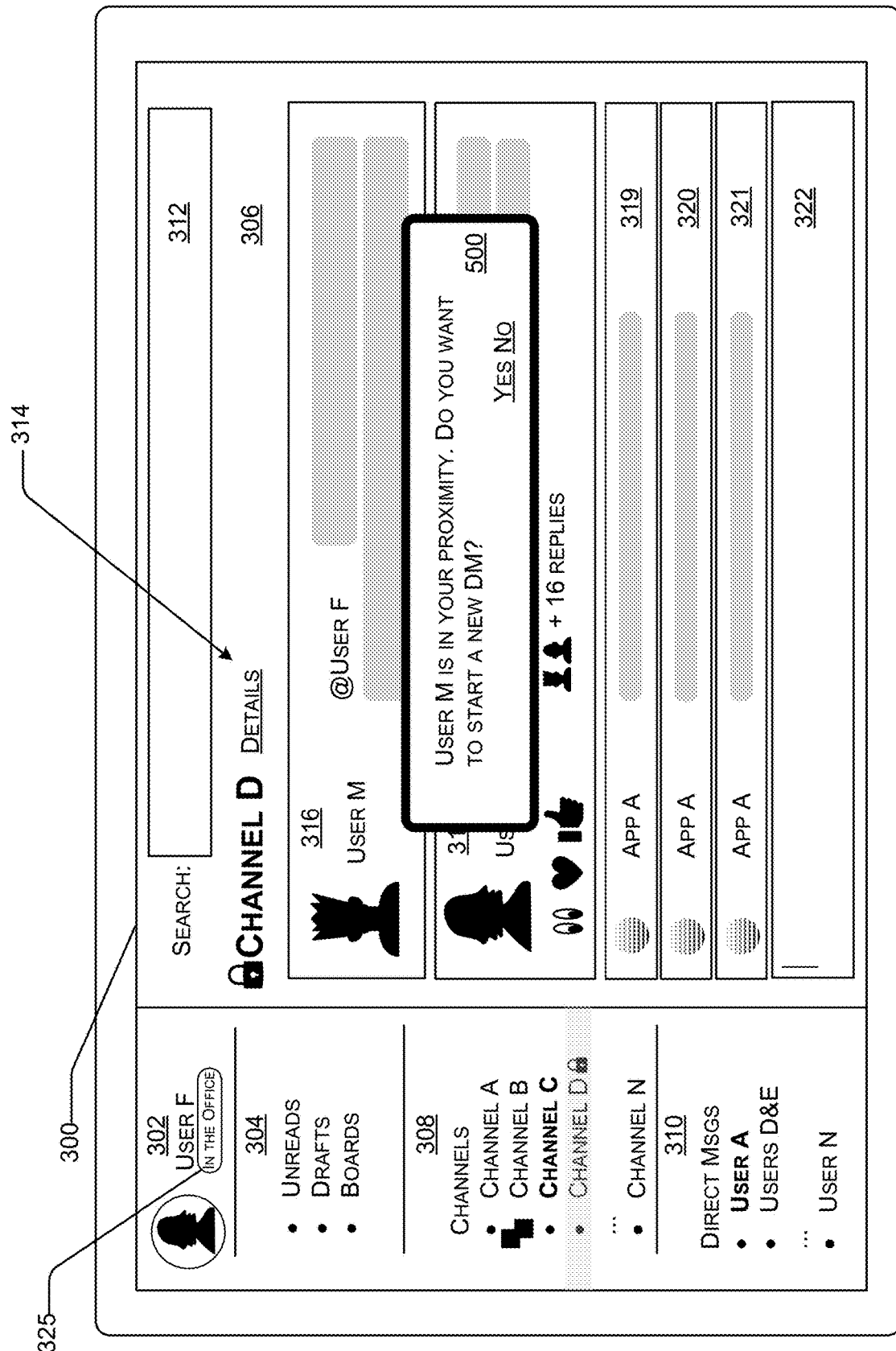
FIG. 5 illustrates yet another example of the user interface of FIG. 3, wherein the user interface includes an indication of at least one of proximity or context data associated with a user of the communication platform.

In some examples, as illustrated in FIG. 5, the context determination component 117 can cause a user interface element 500 to be presented via the user interface 300, wherein the user interface element 500 includes context data and/or an affordance to perform an action. As illustrated in FIG. 5, the user interface element 500 provides an indication that User M is proximate User F and includes an affordance to start a new direct message (DM) with User M. In at least one example, the user can interact with an actuation mechanism (i.e., "yes" or "no") to provide an indication as to whether the user desires to create a new direct message. Based at least in part on receiving an indication that the user desires to create a new direct message, the application 140 can send an indication of such to the server(s) 102 and the direct message management component 119 can generate a new direct message. In at least one example, the third subsection 310 can be updated to include the new direct message. The new direct message can enable User F and User M to communicate via a private virtual space. In examples where users can create a new virtual space to communicate with proximate users, such creation can be facilitated via a single interaction with the user interface 300 (e.g., interaction with the user interface element 500). Such a single interaction can alleviate the need to manually add individual users to a virtual space and request the new virtual space be created. That is, techniques described herein reduce the number of interactions between users and user interfaces of the communication platform, therefore enabling virtual spaces to be created quicker than with existing techniques.

In some examples, User F and User M may already be associated with a direct message. In such examples, the context determination component 117 can present the option to open the existing direct message and/or can rearrange the indications of direct messages, as illustrated in FIG. 4 above.

Figure 6:
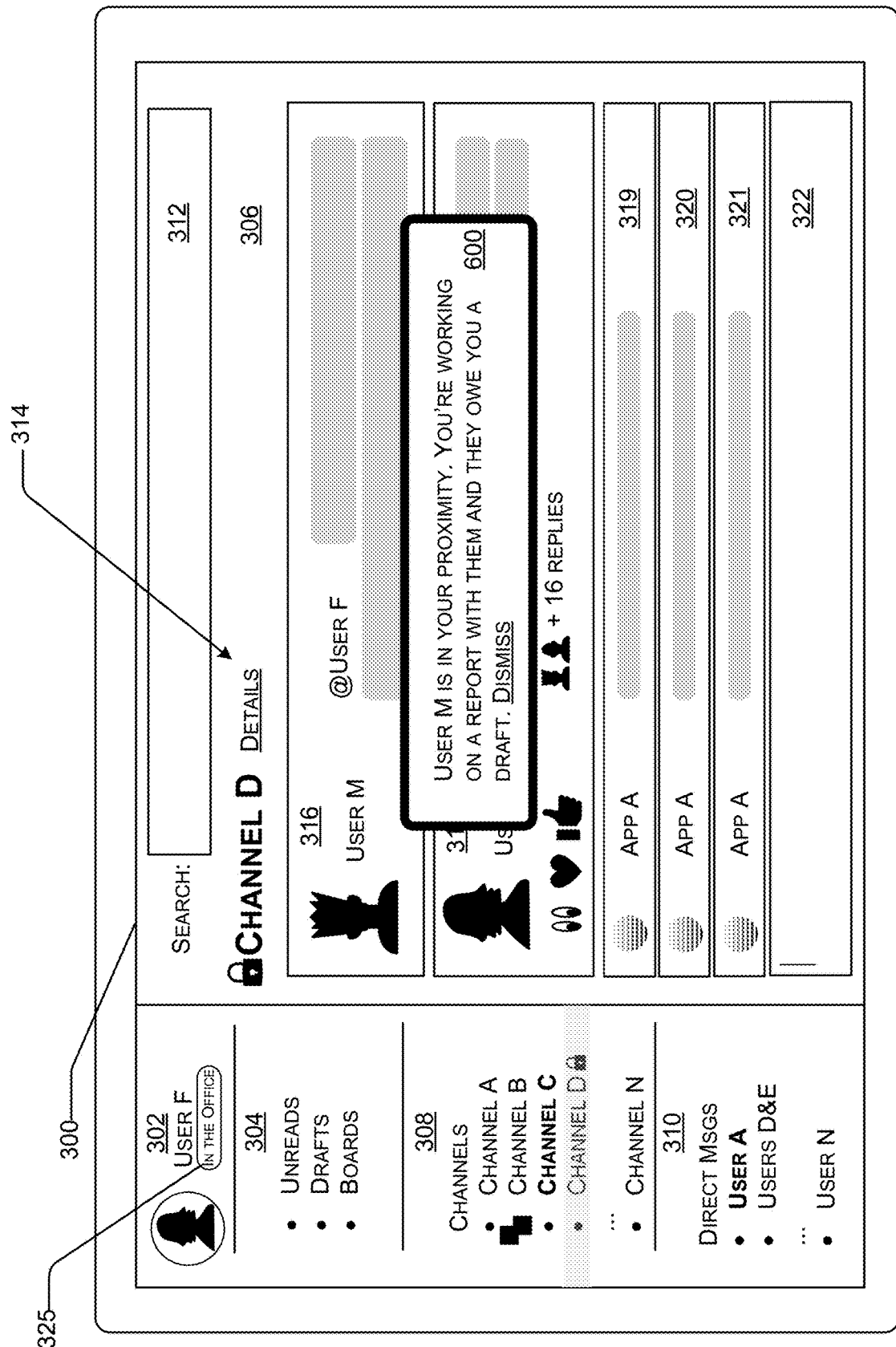
FIG. 6 illustrates yet another example of the user interface of FIG. 3, wherein the user interface includes an indication of at least one of proximity or context data associated with a user of the communication platform.

In some examples, as illustrated in FIG. 6, the context determination component 117 can cause a user interface element 600 to be presented via the user interface 300, wherein the user interface element 600 includes proximity data and/or context data. For example, the user interface element 600 includes an indication that User F is working on a report with User M and that User M owes User F a draft. As described above, such context data can be determined based at least in part on a task list including a task associated with User M and User F. In at least one example, the user can interact with an actuation mechanism (i.e., "dismiss") to dismiss the indication. In at least one example, the user interface element 600 can be ephemeral such that it can disappear from the user interface 300 after a period of time, after the users are no longer determined to be proximate one another, and/or the like.

FIGS. 1 and 3-6 make reference to "user interface elements." A user interface element can be any element of the user interface that is representative of an object, message object, virtual space, and/or the like. A user interface element can be a text element, a graphical element, a picture, a logo, a symbol, and/or the like. In some examples, a user interface element can be presented as a pop-up, overlay, new sections of the user interface 300, a new user interface, part of another user interface element, and/or the like. In at least one example, individual of the user interface elements can be associated with actuation mechanisms. Such actuation mechanisms can make the corresponding user interface elements selectable or otherwise interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 300, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

Figure 7:
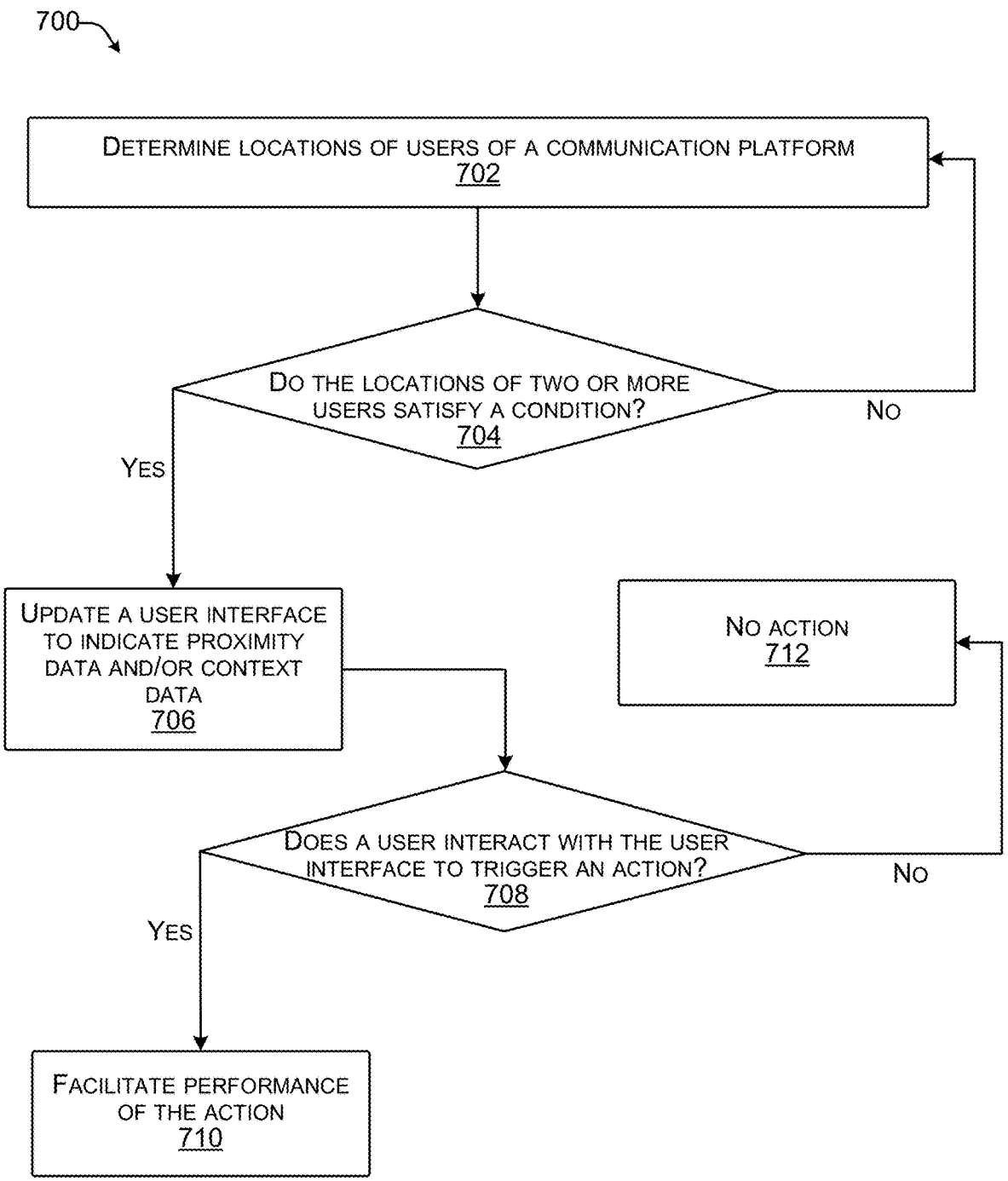
FIG. 7 illustrates an example process for updating a user interface of a communication platform based at least in part on a determination that location(s) of user(s) satisfy a condition, as described herein.
Figure 8:
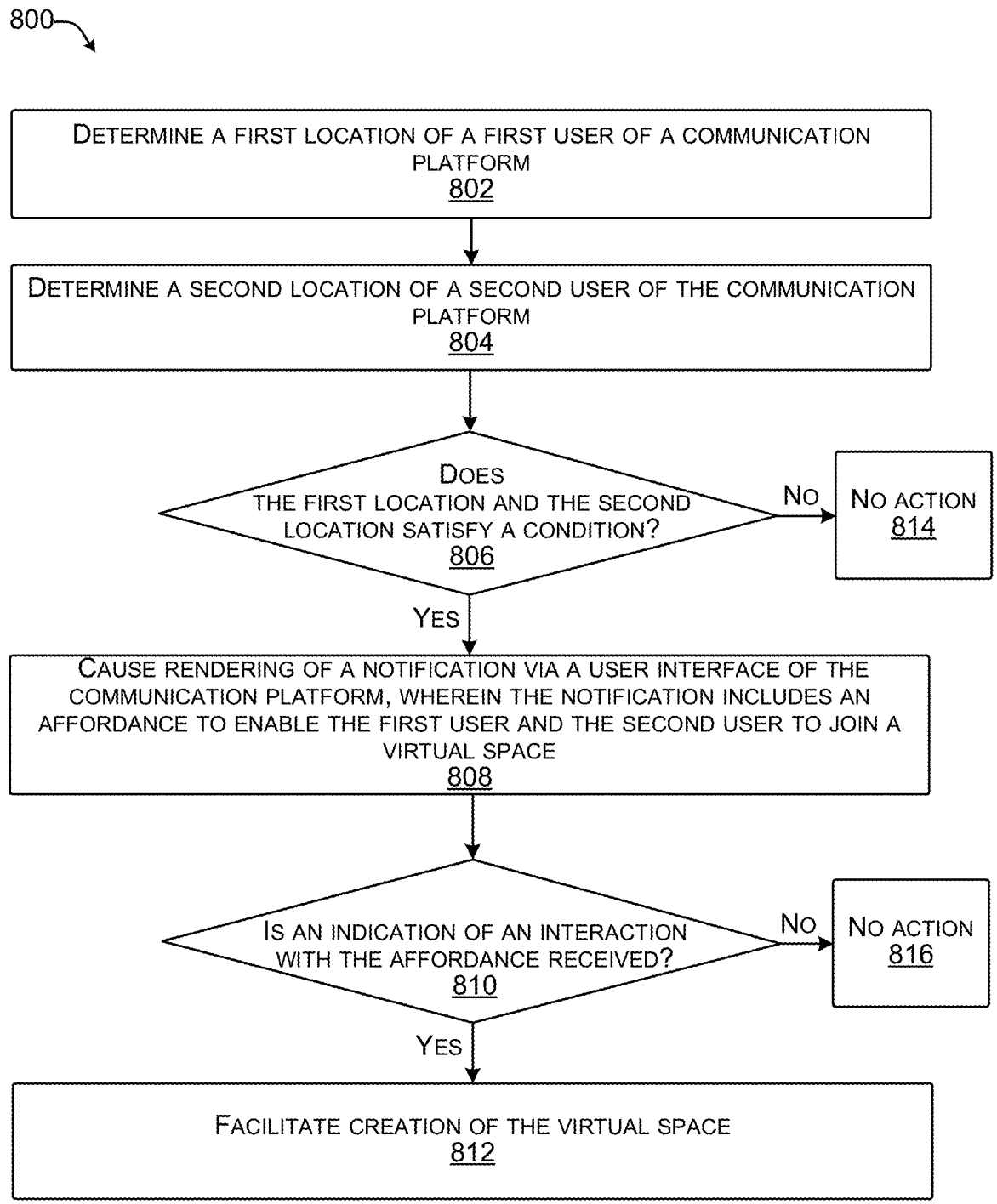
FIG. 8 illustrates an example process for generating a new virtual space of a communication platform based at least in part on a determination that location(s) of user(s) satisfy a condition, as described herein.
Figure 9:
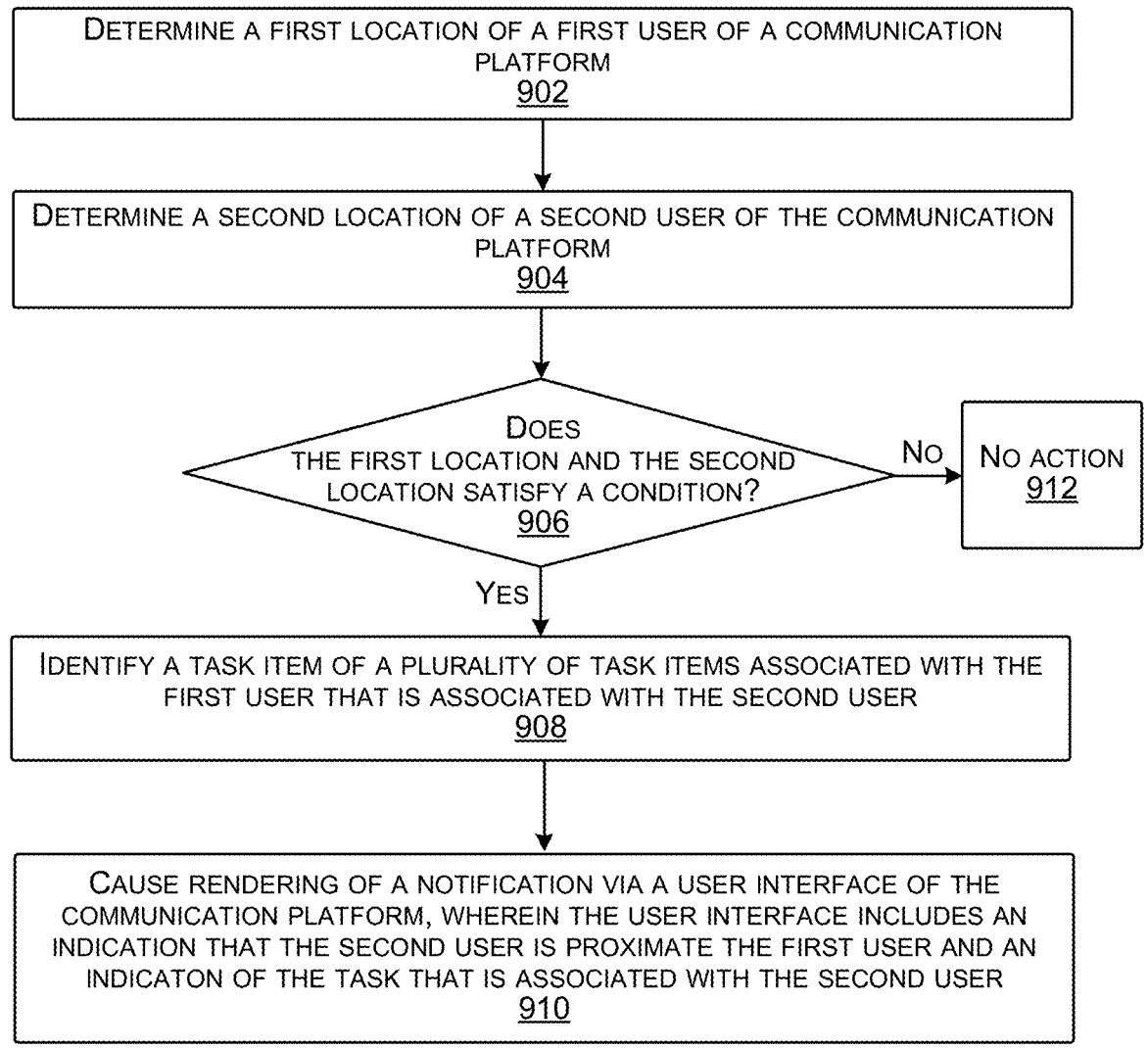
FIG. 9 illustrates an example process for identifying and/or rendering a notification associated with a task to be completed by a user of a communication platform based at least in part on a determination that location(s) of user(s) satisfy a condition, as described herein.

FIGS. 7-9 are flowcharts showing example processes involving techniques as described herein. The processes illustrated in FIGS. 7-9 are described with reference to components of the environment 100 shown in FIG. 1 for convenience and ease of understanding. However, the processes illustrated in FIGS. 7-9 are not limited to being performed using the components described above with reference to the environment 100. Moreover, the components described above with reference to the environment 100 are not limited to performing the processes illustrated in FIGS. 7-9.

The processes in FIGS. 7-9 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations.

Generally, computer-executable instructions include routines, programs, objects, components, message objects, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 7-9 can be combined in whole or in part with each other or with other processes.

FIG. 7 illustrates an example process 700 for updating a user interface of a communication platform based at least in part on a determination that location(s) of user(s) satisfy a condition, as described herein.

At operation 702, the location determination component 116 can determine locations of users of a communication platform. As described above, in at least one example, the location determination component 116 can utilize one or more location determination techniques utilizing location data, network data, IP addresses, beacon data, sensor data, and/or the like.

In at least one example, the location determination component 116 can receive location data, such as GPS data from clients of users of the communication platform. In at least one example, such location data can be used to determine locations of users of the communication platform.

In at least one example, the location determination component 116 can receive network access information, such as which network access points individual clients are using to access the network(s) 106 (e.g., Wi-Fi access point, cellular access point, etc.), which IP addresses individual clients are using to access the network(s) 106, and/or the like. In at least one example, a location corresponding to an access point, IP address, etc. can be associated with a user using such an access point, IP address, etc. to access the network(s) 106. As such, the location determination component 116 can determine a location of a user based at least in part on a determination of which access point, IP address, etc. is being used to access the network(s) 106.

In some examples, a location can have beacons or other sensing devices distributed within and/or around the location. Such beacons or other sensing devices can provide sensor data to the location determination component 116 (e.g., directly or indirectly via intermediary computing devices). In at least one example, the location determination component 116 can determine a location of a user based at least in part on such sensor data.

In some examples, a user can utilize a camera or video capturing mechanism on their user computing device 104 to capture an image and/or video of their surroundings. In some examples, such image and/or video data can be provided to the location determination component 116 (e.g., directly or indirectly via a component associated with a user computing device 104). In such examples, the location determination component 116 (or another component associated with the server(s) 102) can perform image processing, sound processing, and/or the like to determine a location of the user.

At operation 704, the location determination component 116 can determine whether locations of two or more users satisfy a condition. In at least one example, the location determination component 116 can compare determined locations of users to determine whether individual of the determined locations satisfy a condition. In some examples, the condition can correspond to association with a same geofence. In some examples, the condition can correspond to having locations within a threshold distance of one another. In some examples, the condition can correspond to association with a same geographic location. In some examples, the condition can correspond to a determination of proximity.

As described above, in some examples, determined locations of users can be used to determine proximity of users. For instance, in at least one example, determined locations of users can be used to determine that two or more users are within a geofence (e.g., a virtual perimeter for a real-world geographic area). In some examples, when two or more users are associated with a same geofence, can satisfy a condition and the location determination component 116 can determine that the two or more users are proximate one another or are co-located.

In some examples, determined locations of users can be used to determine that two or more users are within a threshold distance of one another. For example, the location determination component 116 can determine a first location associated with a first user using one or more of the techniques described above. The location determination component 116 can determine a second location associated with a second user using one or more of the techniques described above. In at least one example, the location determination component 116 can determine that the first location is within a threshold distance of the second location. In some examples, based at least in part on a determination that two or more users that are within a threshold distance of one another, the location determination component 116 can determine satisfaction of a condition and can determine that the one or more users are proximate or co-located.

In some examples, determined locations of users can be used to determine that two or more users are in a same geographic location, such as a town, a neighborhood, a building, a floor, a conference room, and/or the like. For example, the location determination component 116 can determine, based at least in part on map data associated with a map (e.g., a diagrammatic representation of an area that can include features of the area), a first location associated with the first user corresponds to a geographic location on a map. The location determination component 116 can determine, based at least in part on the map data, a second location associated with the second user corresponds to the geographic location on the map. In some examples, a geographic location can be associated with a geofence. In some examples, users that are in a same geographic location of one another can satisfy a condition and the location determination component 116 can determine that the users are proximate one another or are co-located.

In some examples, two or more users using a same access point, same IP address, etc. can be determined to satisfy a condition and can therefore be determined to be proximate one another or co-located.

As described above, in some examples, additional or alternative location determination techniques can be used to determine locations, and thus proximities, of users of the communication platform. For instance, in at least one example, a first client of a first user can detect that a second client of a second user is proximate to the first client. In some examples, the user computing device 104 can output a signal such as a BLE signal, a NFC signal, an inaudible sound signal, and/or another proximity sensor signal that is detectable by other user computing devices. In such an example, the first client can detect a signal from a second client and, based at least in part on a determination that the signal strength meets or exceeds a threshold, can determine that the second client is proximate the first client. In some examples, the first client can utilize triangulation or other proximity determination techniques to determine that the second client is proximate the first client. In such an example, the first client can send an indication of such proximity to the server(s) 102. The location determination component 116 can determine that the first and second users are proximate or co-located based at least in part on receiving such an indication. As such, in at least one example, the location determination component 116 can determine satisfaction of a condition.

At operation 706, based at least in part on a determination that locations of two or more users satisfy the condition (i.e., "yes" at operation 704), the context determination component 117 can update a user interface to indicate proximity data and/or context data. In some examples, proximity can comprise a condition for updating the user interface such that satisfaction of the condition (i.e., a determination of proximity) can cause the update to the user interface. That is, in some examples, proximity can comprise a condition for updating the user interface such that satisfaction of the condition (i.e., a determination of proximity) can cause the update to the user interface. In some examples, such an update can include proximity data and/or context data.

In at least one example, the context determination component 117 can access and/or determine context data associated with two or more proximate or co-located users of the communication platform. For example, based at least in part on determining that two or more users are proximate one another, the context determination component 117 can access data associated with each of the users to determine context data. In at least one example, the context data can be presented via a user interface of the communication platform and/or can be used to update features of the user interface. Furthermore, in some examples, the context data can be used to recommend an action for one of the two or more users to perform and/or initiate performance thereof.

In some examples, the context determination component 117 can access interaction data associated with interactions between each of the users and the communication platform. Such interaction data can indicate whether the two or more users have exchanged messages or otherwise collaborated via the communication platform, virtual space(s) within which the two or more users have exchanged messages or otherwise collaborated via the communication platform, a most recent interaction between the two or more users, read statuses associated with individual messages, tasks associated with the two or more users, and/or the like. In some examples, based at least in part on determining that the two or more users are proximate one another, the context determination component 117 can determine context data based at least in part on the interaction data.

In at least one example, based at least in part on determining that the two or more users are proximate one another, the context determination component 117 can cause an indication of a level of interactivity between the two or more users to be presented via a user interface of the communication platform. In some examples, based at least in part on determining that the two or more users are proximate one another, the context determination component 117 can cause an indication of the virtual space(s) with which the two or more users are associated to be presented via a user interface of the communication platform, an indication of the most recent interaction between the two or more users to be presented via the user interface of the communication platform, an indication that a message has not yet been read (and the message), and/or the like. Surfacing such information can provide an improvement over existing techniques in that accessing relevant interaction data when a user is determined to be proximate another user can alleviate the need for users to browse and scroll through significant amounts of data if/when they approach/are approached by other proximate users.

In some examples, the context determination component 117 can cause a user interface of the communication platform to be updated based on determined context data, for example, by rearranging an order of channels, direct messages, and/or the like as they are presented via the user interface such to prioritize a channel, direct message, or the like with which the two or more proximate users are associated. Prioritizing such information can provide an improvement over existing techniques in that prioritizing relevant interaction data when a user is determined to be proximate another user can alleviate the need for users to browse and scroll through significant amounts of data if/when they approach/are approached by other proximate users. In some examples, the context determination component 117 can filter search results based on proximity and/or context data. Such filtering can reduce computing resources required for performing a search and can enable search results to be more quickly returned.

In some examples, based at least in part on determining that two or more users are proximate one another, the context determination component 117 can access task list data indicating one or more tasks associated with each of the two or more users. In some examples, individual of the tasks can be associated with individual users. In at least one example, the context determination component 117 can determine that a task is associated with the two or more proximate users and can cause an indication of such a task to be presented via a user interface of the communication platform. That is, in some examples, the task list data can comprise context data, which can be used by the context determination component 117 for updating the user interface.

In some examples, based at least in part on determining that two or more users are proximate one another, the context determination component 117 can access organizational data of organization(s) with which the two or more users are associated. In some examples, such organizational data can indicate role(s) of individual users, a reporting structure or hierarchy of individual users, and/or the like. In some examples, based at least in part on determining that the two or more users are associated with a particular relationship (e.g., same role, hierarchical roles (e.g., one reports to the other, etc.), etc.), the context determination component 117 can cause an indication to be presented via a user interface of the communication platform that indicates the particular relationship. That is, in some examples, the organizational data can comprise context data, which can be used by the context determination component 117 for updating the user interface.

In some examples, based at least in part on determining that two or more users are proximate one another, the context determination component 117 can access user data associated with the two or more users. In some examples, such user data can be stored in the datastore 122. In some examples, such user data can be accessible from a third-party platform integrated with the communication platform (e.g., via the use of one or more API(s), etc.). Such user data can indicate preferences of the users, contact information for the users, whether the users are looking for other users to participate in an event (e.g., a meal, a workgroup, an activity, etc.), skills of the users, roles of the users, groups with which the users are associated, hobbies of the users, recent purchases of the users, social networks of the users, etc. In some examples, the context determination component 117 can cause user data to be presented via a user interface of the communication platform to enable proximate users to learn about one another. That is, in some examples, the user data can comprise context data, which can be used by the context determination component 117 for updating the user interface. In some examples, such updates can indicate preferences of proximate users, contact information for proximate users, whether proximate users are looking for other users to participate in an event (e.g., a meal, a workgroup, an activity, etc.), skills of proximate users, roles of proximate users, groups with which proximate users are associated, hobbies of proximate users, recent purchases of proximate users, social networks of proximate users, etc.

In some examples, the context determination component 117 can utilize location data and/or proximity data to determine context data that can be presented via a user interface of the communication platform. For example, based at least in part on the location data indicating that a user is in a geographical location that corresponds to an office building and/or is connecting to the network(s) 106 via a particular network access point and/or IP address corresponding to the office building, the context determination component 117 can cause an indication that the user is in the office to be presented via a user interface of the communication platform. In some examples, instead of identifying that user is in an office building, the context determination component 117 can determine that a user is in a particular conference room, building, neighborhood, town, or the like and can cause an indication of such to be presented via a user interface of the communication platform. In some examples, the context determination component 117 can determine directions to enable users to find other proximate users and/or locations (e.g., a particular conference room, building, neighborhood, town, or the like), for example by outputting turn-by-turn directions, presenting a map to guide a user in a space, haptic or other tactile output, and/or the like. In some examples, the context determination component 117 can utilize context data to cause user interface elements to be presented via a user interface of the communication platform to indicate proximity of users, locations of users, directions, and/or the like. In some examples, user computing device(s) can output sounds or other signals to indicate proximity, location, and/or guide a user to other proximate users and/or locations. Like other location data and/or personally identifiable information, a user can be required to opt in to sharing their location and/or directions to their location.

In some examples, the context determination component 117 can utilize context data to recommend an action for a user of two or more proximate users to perform and/or initiate performance thereof. For example, based at least in part on receiving an indication that two or more users are proximate one another, the context determination component 117 can recommend that the two or more users create a new virtual space, such as a channel, a direct message, an asynchronous meeting, a video conference, a board, or the like. In such an example, the context determination component 117 can cause an affordance to be presented via a user interface of the communication platform to enable the two or more users to create such a new virtual space. In at least one example, when the new virtual space is created, the user interface can be updated to include the new virtual space. In examples where users can create a new virtual space to communicate with proximate users, such creation can be facilitated via a single interaction with the user interface. Such a single interaction can alleviate the need to manually add individual users to a virtual space and request the new virtual space be created. That is, techniques described herein reduce the number of interactions between users and user interfaces of the communication platform, therefore enabling virtual spaces to be created quicker than with existing techniques.

In some examples, based at least in part on receiving an indication that two or more users are proximate one another, the context determination component 117 can recommend that the two or more users reserve a conference room and can cause an affordance to be presented via a user interface of the communication platform to enable the two or more users to reserve a conference room. Additional or alternative actions are within the scope of this disclosure.

At operation 708, the context determination component 117 can determine whether a user interacts with the user interface to trigger an action. As described above, in some examples, the context determination component 117 can utilize context data to recommend an action for a user of two or more proximate users to perform. The context determination component 117 can receive indications of whether a user interacts with the user interface and if the user interacts with the user interface, context associated therewith. In at least one example, the context determination component 117 can receive an indication that the user interacted with the user interface such to trigger an action. In at least one example, the user can interact with an affordance presented via the user interface to trigger an action, the application 140 can detect the interaction, and can send an indication thereof to the server(s) 102.

At operation 710, based at least in part on a determination that the user interacts with the user interface to trigger an action (i.e., "yes" at operation 708), the context determination component 117 can facilitate performance of the action. That is, in at least one example, based at least in part on receiving an indication that the user desires to have the action performed, the context determination component 117 can interact with one or more other components of the server(s) 102 to facilitate performance of the action. For example, if the action is associated with creating a new virtual space, the context determination component 117 can interact with the channel management component 118 or the direct message management component 119 to create a new virtual space.

At operation 712, based at least in part on a determination that the user does not interact with the user interface to trigger an action (i.e., "no" at operation 708), the context determination component 117 can refrain from performing an action.

FIG. 8 illustrates an example process 800 for generating a new virtual space of a communication platform based at least in part on a determination that location(s) of user(s) satisfy a condition, as described herein.

At operation 802, the location determination component 116 can determine a first location of a first user of a communication platform. That is, the location determination component 116 can utilize one or more of the location determination techniques described above with reference to operation 702 of FIG. 7 to determine a first location of a first user.

At operation 804, the location determination component 116 can determine a second location of a second user of a communication platform. That is, the location determination component 116 can utilize one or more of the location determination techniques described above with reference to operation 702 of FIG. 7 to determine a second location of a second user.

At operation 806, the location determination component 116 can determine whether the first location and the second location satisfy a condition. As described above with reference to operation 706 of FIG. 7, in at least one example, a condition can be associated with a determination of proximity. In at least one example, the location determination component 116 can determine whether the first location and the second location satisfy a condition such that the first user and the second user are proximate users.

At operation 808, based at least in part on a determination that the first location and the second location satisfy the condition (i.e., "yes" at operation 806), the context determination component 117 can cause rendering of a notification via a user interface of the communication platform, wherein the notification includes an affordance to enable the first user and the second user to join a virtual space. In some examples, the context determination component 117 can utilize context data to recommend an action for the first user and/or second user to perform. For example, based at least in part on determining that the first location and the second location satisfy a condition, the context determination component 117 can recommend that the first user and the second user create a new virtual space, such as a channel, a direct message, an asynchronous meeting, a video conference, a board, or the like. In such an example, the context determination component 117 can cause an affordance to be presented via a user interface of the communication platform to enable the first user and/or the second user to create such a new virtual space.

At operation 810, the context determination component 117 can determine whether an indication of an interaction with the affordance is received. The context determination component 117 can receive indications of whether a user interacts with the user interface and if the user interacts with the user interface, context associated therewith. In at least one example, the context determination component 117 can receive an indication that the first user and/or the second user interacted with the affordance (e.g., from an instance of the application 140 associated with respective clients).

At operation 812, based at least in part on a determination that an indication of an interaction with the affordance is received (i.e., "yes" at operation 810), the context determination component 117 can facilitate creation of the virtual space. That is, in at least one example, based at least in part on receiving an indication that the first user and/or the second user desires to have the action performed, the context determination component 117 can interact with one or more other components of the server(s) 102 to facilitate performance of the action. For example, the context determination component 117 can interact with the channel management component 118 or the direct message management component 119 to create a new virtual space. As described above, in such examples, where users can create a new virtual space to communicate with proximate users, such creation can be facilitated via a single interaction with the user interface. Such a single interaction can alleviate the need to manually add individual users to a virtual space and request the new virtual space be created. That is, techniques described herein reduce the number of interactions between users and user interfaces of the communication platform, therefore enabling virtual spaces to be created quicker than with existing techniques.

At operation 814, based at least in part on a determination that the first location and the second location do not satisfy a condition (i.e., "no" at operation 806), the location determination component 116 can refrain from performing an action.

At operation 816, based at least in part on a determination that an indication of an interaction with the affordance is not received (i.e., "no" at operation 810), the context determination component 117 can refrain from performing an action.

FIG. 9 illustrates an example process 900 for identifying and/or rendering a notification associated with a task to be completed by a user of a communication platform based at least in part on a determination that location(s) of user(s) satisfy a condition, as described herein.

At operation 902, the location determination component 116 can determine a first location of a first user of a communication platform. That is, the location determination component 116 can utilize one or more of the location determination techniques described above with reference to operation 702 of FIG. 7 to determine a first location of a first user.

At operation 904, the location determination component 116 can determine a second location of a second user of a communication platform. That is, the location determination component 116 can utilize one or more of the location determination techniques described above with reference to operation 702 of FIG. 7 to determine a second location of a second user.

At operation 906, the location determination component 116 can determine whether the first location and the second location satisfy a condition, as described above with reference to operation 806 of FIG. 8.

At operation 908, the context determination component 117 can identify a task item of a plurality of task items associated with the first user that is also associated with the second user. In some examples, based at least in part on determining that the first location and the second location satisfy a condition, the context determination component 117 can access task list data indicating one or more tasks associated with the first user and/or the second user. In some examples, individual of the tasks can be associated with individual users. In at least one example, the context determination component 117 can determine that a task of the first user is associated with the second user (or vice versa).

At operation 910, the context determination component 117 can cause rendering of a notification via a user interface of the communication platform, wherein the user interface includes an indication that the second user is proximate the first user and an indication that the task is associated with the second user. In at least one example, based at least in part on the context determination component 117 determining that a task is associated with the first and second users, the context determination component 117 can cause an indication of such a task to be presented via a user interface of the communication platform.

At operation 912, based at least in part on a determination that the first location and the second location do not satisfy a condition (i.e., "no" at operation 906), the location determination component 116 can refrain from performing an action.

FIGS. 3-9 provide examples of updates to user interfaces that can be made based on location data, proximity data, and/or context data. Such user interfaces (e.g., in FIGS. 3-6) and processes (e.g., in FIGS. 7-9) are provided as examples and are not to be construed as limiting. That is, techniques described herein can be used to update a user interface of the communication platform to present any context data as described herein. As described above, in some examples, such an update can comprise a presentation of a user interface element, a rearrangement of features of the user interface, a rendering of an affordance, and/or the like.

Techniques described above therefore leverage location data to determine proximities between two or more users and surface relevant data to users of a communication platform that would not otherwise be available without techniques described above. That is, the use of communication platform data and location data to render updates to a user interface of the communication platform is an unconventional approach to improving experiences of users using such a communication platform.

For example, techniques described above enable users to access proximity data and/or context data associated with other users to enhance collaboration and provide improvement over existing collaboration techniques. In examples where proximity can be used to rearrange features of a user interface, such rearrangement can enable users to access relevant data (e.g., associated with proximate users) quickly instead of having to browse through various channels, direct messages, or other communication platform data. As such, techniques described above enable improvements over existing techniques. Moreover, in examples where proximity data can be used to narrow the scope of a search, techniques described above can reduce computing resources required for performing a search and can enable search results to be more quickly returned. As such, techniques described above provide improvements over existing techniques. Further, in examples, where techniques described above enable users to create a new virtual space to communicate with proximate users, such creation can be facilitated via a single interaction with the user interface. Such a single interaction can alleviate the need to manually add individual users to a virtual space and request the new virtual space be created. That is, techniques described above reduce the number of interactions between a user and a user interface of the communication platform, therefore enabling virtual spaces to be created quicker than with existing techniques. As such, techniques described above provide improvements over existing techniques.

In addition to improvements described above, techniques described above enable users to learn about other users with whom they work or otherwise interact. With user consent to share information, techniques described above can surface relevant information about proximate users so that such users can better collaborate. Techniques described above are useful for facilitating collaboration and connection in a remote or distributed workforce, wherein users who may not know one another beyond a name on a screen have the opportunity to connect in person with other users within their proximity. As such, techniques described above offer improvements over existing techniques.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A method, implemented at least in part by a computing device of a group-based communication platform, comprising: determining, for a first user of the group-based communication platform, a first location of the first user; determining, for at least a second user of the group-based communication platform, a second location of the second user; and based at least in part on a determination that the first location and the second location satisfy a condition, causing a user interface of the group-based communication platform to be updated, wherein the updated user interface indicates at least one of (i) proximity data associated with the first user and the second user or (ii) context data associated with at least one of the first user or the second user.

B. The method of paragraph A, wherein the condition comprises a threshold distance, and wherein the determination that the condition is satisfied is based at least in part on a determination that the first location and the second location are within the threshold distance.

C. The method of paragraph A or B, wherein the condition is associated with a geofence, and wherein the determination that the condition is satisfied is based at least in part on a determination that the first location and the second location are within the geofence.

D. The method of any of paragraphs A-C, wherein the condition is associated with a particular location, and wherein the determination that the condition is satisfied is based at least in part on a determination that the first location and the second location are the particular location.

E. The method of any of paragraphs A-D, further comprising: based at least in part on the determination that the condition is satisfied, accessing a plurality of task items associated with the first user; and causing the user interface to be updated further based at least in part on a determination that a task of the plurality of task items is associated with the second user, wherein the updated user interface indicates the proximity data and the context data, wherein the proximity data indicates that the second user is proximate the first user, and wherein the context data indicates that the task is associated with the second user.

F. The method of any of paragraphs A-E, wherein the updated user interface includes an affordance to enable at least one of the first user or the second user to generate a virtual space associated with the first user and at least the second user.

G. The method of any of paragraphs A-F, wherein the context data comprises an indication of a virtual space with which the first user and the second user are both associated, and wherein the virtual space comprises a channel or a direct message.

H. A system comprising: one or more processors; and one or more non-transitory computer-readable media storing instructions that, when executed by the one or more processors, cause the system to perform operations comprising: determining, for a first user of a group-based communication platform, a first location of the first user; determining, for at least a second user of the group-based communication platform, a second location of the second user; and based at least in part on a determination that the first location and the second location satisfy a condition, causing a user interface of the group-based communication platform to be updated, wherein the updated user interface indicates at least one of (i) proximity data associated with the first user and the second user or (ii) context data associated with at least one of the first user or the second user.

I. The system of paragraph H, wherein the condition comprises a threshold distance, and wherein the determination that the condition is satisfied is based at least in part on a determination that the first location and the second location are within the threshold distance.

J. The system of paragraph H or I, wherein the condition is associated with a geofence, and wherein the determination that the condition is satisfied is based at least in part on a determination that the first location and the second location are within the geofence.

K. The system of any of paragraphs H-J, wherein the condition is associated with a particular location, and wherein the determination that the condition is satisfied is based at least in part on a determination that the first location and the second location is the particular location.

L. The system of any of paragraphs H-K, the operations further comprising: based at least in part on the determination that the condition is satisfied, accessing a plurality of task items associated with the first user; and causing the user interface to be updated further based at least in part on a determination that a task of the plurality of task items is associated with the second user, wherein the updated user interface indicates the proximity data and the context data, wherein the proximity data indicates that the second user is proximate the first user, and wherein the context data indicates that the task is associated with the second user.

M. The system of any of paragraphs H-L, wherein the updated user interface includes an affordance to enable at least one of the first user or the second user to generate a virtual space associated with the first user and at least the second user.

N. The system of any of paragraphs H-M, wherein the context data comprises an indication of a virtual space with which the first user and the second user are both associated, and wherein the virtual space comprises a channel or a direct message.

O. One or more non-transitory computer-readable media storing instructions that, when executed by one or more processors, cause the one or more processors to perform operations comprising: determining, for a first user of a group-based communication platform, a first location of the first user; determining, for at least a second user of the group-based communication platform, a second location of the second user; and based at least in part on a determination that the first location and the second location satisfy a condition, causing a user interface of the group-based communication platform to be updated, wherein the updated user interface indicates at least one of (i) proximity data associated with the first user and the second user or (ii) context data associated with at least one of the first user or the second user.

P. The one or more non-transitory computer-readable media of paragraph O, wherein the condition comprises a threshold distance, and wherein the determination that the condition is satisfied is based at least in part on a determination that the first location and the second location are within the threshold distance.

Q. The one or more non-transitory computer-readable media of paragraph O or P, wherein the condition is associated with a geofence, and wherein the determination that the condition is satisfied is based at least in part on a determination that the first location and the second location are within the geofence.

R. The one or more non-transitory computer-readable media of any of paragraphs O-Q, wherein the condition is associated with a particular location, and wherein the determination that the condition is satisfied is based at least in part on a determination that the first location and the second location are the particular location.

S. The one or more non-transitory computer-readable media of any of paragraphs O-R, the operations further comprising: based at least in part on the determination that the condition is satisfied, accessing a plurality of task items associated with the first user; and causing the user interface to be updated further based at least in part on a determination that a task of the plurality of task items is associated with the second user, wherein the updated user interface indicates the proximity data and the context data, wherein the proximity data indicates that the second user is proximate the first user, and wherein the context data indicates that the task is associated with the second user.

T. The one or more non-transitory computer-readable media of any of paragraphs O-S, wherein the updated user interface includes an affordance to enable at least one of the first user or the second user to generate a virtual space associated with the first user and at least the second user.

While the paragraphs above are described with respect to one particular implementation, it should be understood that, in the context of this document, the content of the paragraphs above can also be implemented via a method, device, system, a computer-readable medium, and/or another implementation. Additionally, any of paragraphs A-T may be implemented alone or in combination with any other one or more of the paragraphs A-T.

What is claimed is:

1. A method, implemented at least in part by a computing device of a group-based communication platform, comprising:
   determining, for a first user of the group-based communication platform, a first location of the first user;
   determining, for at least a second user of the group-based communication platform, a second location of the second user; and
   based at least in part on a determination that the first location and the second location satisfy a condition, causing a user interface of the group-based communication platform to be updated by causing an order of one or more features of the group-based communication platform that are associated with the first user and the second user to be rearranged, wherein the user interface, after being updated, indicates at least one of (i) proximity data associated with the first user and the second user or (ii) context data associated with at least one of the first user or the second user.

2. The method of claim 1, wherein the condition comprises a threshold distance, and wherein the determination that the condition is satisfied is based at least in part on a second determination that the first location and the second location are within the threshold distance.

3. The method of claim 1, wherein the condition is associated with a geofence, and wherein the determination that the condition is satisfied is based at least in part on a second determination that the first location and the second location are within the geofence.

4. The method of claim 1, wherein the condition is associated with a particular location, and wherein the determination that the condition is satisfied is based at least in part on a second determination that the first location and the second location are the particular location.

5. The method of claim 1, further comprising:
based at least in part on the determination that the condition is satisfied, accessing a plurality of task items associated with the first user; and
causing the user interface to be updated further based at least in part on a second determination that a task of the plurality of task items is associated with the second user, wherein the user interface, after being further updated, indicates the at least one of the proximity data or the context data, wherein the proximity data indicates that the second user is proximate the first user, and wherein the context data indicates that the task is associated with the second user.

6. The method of claim 1, wherein the user interface, after being updated, includes an affordance to enable at least one of the first user or the second user to generate a virtual space associated with the first user and at least the second user.

7. The method of claim 1, wherein the context data comprises an indication of a virtual space with which the first user and the second user are both associated, and wherein the virtual space comprises a channel or a direct message.

8. A system comprising:
one or more processors; and
one or more non-transitory computer-readable media storing instructions that, when executed by the one or more processors, cause the system to perform operations comprising:
determining, for a first user of a group-based communication platform, a first location of the first user;
determining, for at least a second user of the group-based communication platform, a second location of the second user; and
based at least in part on a determination that the first location and the second location satisfy a condition, causing a user interface of the group-based communication platform to be updated by causing an order of one or more features of the group-based communication platform that are associated with the first user and the second user to be rearranged, wherein the user interface, after being updated, indicates at least one of (i) proximity data associated with the first user and the second user or (ii) context data associated with at least one of the first user or the second user.

9. The system of claim 8, wherein the condition comprises a threshold distance, and wherein the determination that the condition is satisfied is based at least in part on a second determination that the first location and the second location are within the threshold distance.

10. The system of claim 8, wherein the condition is associated with a geofence, and wherein the determination that the condition is satisfied is based at least in part on a second determination that the first location and the second location are within the geofence.

11. The system of claim 8, wherein the condition is associated with a particular location, and wherein the determination that the condition is satisfied is based at least in part on a second determination that the first location and the second location is the particular location.

12. The system of claim 8, the operations further comprising:
based at least in part on the determination that the condition is satisfied, accessing a plurality of task items associated with the first user; and
causing the user interface to be updated further based at least in part on a second determination that a task of the plurality of task items is associated with the second user, wherein the user interface, after being further updated, indicates the at least one of the proximity data or the context data, wherein the proximity data indicates that the second user is proximate the first user, and wherein the context data indicates that the task is associated with the second user.

13. The system of claim 8, wherein the user interface, after being updated, includes an affordance to enable at least one of the first user or the second user to generate a virtual space associated with the first user and at least the second user.

14. The system of claim 8, wherein the context data comprises an indication of a virtual space with which the first user and the second user are both associated, and wherein the virtual space comprises a channel or a direct message.

15. One or more non-transitory computer-readable media storing instructions that, when executed by one or more processors, cause the one or more processors to perform operations comprising:
determining, for a first user of a group-based communication platform, a first location of the first user;
determining, for at least a second user of the group-based communication platform, a second location of the second user; and
based at least in part on a determination that the first location and the second location satisfy a condition, causing a user interface of the group-based communication platform to be updated by causing an order of one or more features of the group-based communication platform that are associated with the first user and the second user to be rearranged, wherein the user interface, after being updated, indicates at least one of (i) proximity data associated with the first user and the second user or (ii) context data associated with at least one of the first user or the second user.

16. The one or more non-transitory computer-readable media of claim 15, wherein the condition comprises a threshold distance, and wherein the determination that the condition is satisfied is based at least in part on a second determination that the first location and the second location are within the threshold distance.

17. The one or more non-transitory computer-readable media of claim 15, wherein the condition is associated with a geofence, and wherein the determination that the condition is satisfied is based at least in part on a second determination that the first location and the second location are within the geofence.

18. The one or more non-transitory computer-readable media of claim 15, wherein the condition is associated with a particular location, and wherein the determination that the condition is satisfied is based at least in part on a second determination that the first location and the second location are the particular location.

19. The one or more non-transitory computer-readable media of claim 15, the operations further comprising:
based at least in part on the determination that the condition is satisfied, accessing a plurality of task items associated with the first user; and
causing the user interface to be updated further based at least in part on a second determination that a task of the plurality of task items is associated with the second user, wherein the user interface, after being further updated, indicates the at least one of the proximity data or the context data, wherein the proximity data indicates that the second user is proximate the first user, and wherein the context data indicates that the task is associated with the second user.

20. The one or more non-transitory computer-readable media of claim 15, wherein the user interface, after being updated, includes an affordance to enable at least one of the first user or the second user to generate a virtual space associated with the first user and at least the second user.

* * * * *